(12) United States Patent
Papadopoulos et al.

(10) Patent No.: US 9,876,539 B2
(45) Date of Patent: Jan. 23, 2018

(54) METHOD AND APPARATUS FOR SCALABLE LOAD BALANCING ACROSS WIRELESS HETEROGENEOUS MIMO NETWORKS

(71) Applicants: Haralabos Papadopoulos, Los Altos, CA (US); Ozgun Bursalioglu Yilmaz, Palo Alto, CA (US)

(72) Inventors: Haralabos Papadopoulos, Los Altos, CA (US); Ozgun Bursalioglu Yilmaz, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 194 days.

(21) Appl. No.: 14/738,565

(22) Filed: Jun. 12, 2015

(65) Prior Publication Data

US 2015/0365953 A1 Dec. 17, 2015

Related U.S. Application Data

(60) Provisional application No. 62/012,893, filed on Jun. 16, 2014.

(51) Int. Cl.
*H04B 7/02* (2017.01)
*H04B 7/024* (2017.01)
(Continued)

(52) U.S. Cl.
CPC .......... *H04B 7/024* (2013.01); *H04B 7/0413* (2013.01); *H04W 72/0406* (2013.01); *H04W 72/0413* (2013.01); *H04W 28/08* (2013.01); *H04W 28/22* (2013.01); *H04W 72/12* (2013.01); *H04W 92/12* (2013.01)

(58) Field of Classification Search
CPC . H04B 7/024; H04B 7/0413; H04W 72/0406; H04W 72/0413; H04W 28/08; H04W 28/22; H04W 72/12; H04W 92/12
See application file for complete search history.

(56) References Cited

U.S. PATENT DOCUMENTS 9,681,444 B2 * 6/2017 Amini ............... H04W 72/0446
2010/0041408 A1 * 2/2010 Caire .................... H04L 5/0007
455/446

(Continued)

*Primary Examiner* — Ajay Cattungal

(57) ABSTRACT

A method and apparatus for load balancing in a wireless network is described. In one embodiment, the method comprises receiving, by at least one of the one or more controllers, from at least one of the one or more base stations, information indicative of a rate that can be provided by the at least one base station to at least one client terminal by the at least one base station when serving a group of one or more client terminals, the at least one client terminal being associated to the at least one controller; receiving, by the at least one of the one or more controllers, from the at least one of the one or more base stations, information indicative of the transmission resources provided by the at least one base station for resource allocation among the at least one client terminal by the at least one controller; and determining, by the at least one controller, based on the information indicative of the rate and the information indicative of transmission resources, information indicative of an allocation of base station transmission resources for at least one client terminal from the at least one base station.

23 Claims, 7 Drawing Sheets

(51) Int. Cl.

| | | |
|---|---|---|
| *H04W 72/04* | (2009.01) | |
| *H04B 7/0413* | (2017.01) | |
| H04W 28/08 | (2009.01) | |
| H04W 28/22 | (2009.01) | |
| H04W 72/12 | (2009.01) | |
| H04W 92/12 | (2009.01) | |

(56) References Cited

U.S. PATENT DOCUMENTS

| | | | | |
|---|---|---|---|---|
| 2012/0250551 A1* | 10/2012 | Sartori | ............ | H04W 48/12 370/252 |
| 2013/0155970 A1* | 6/2013 | Tulino | ............ | H04W 72/1273 370/329 |
| 2014/0369271 A1* | 12/2014 | Amini | ............ | H04B 1/44 370/329 |
| 2015/0098377 A1* | 4/2015 | Amini | ............ | H04W 52/0209 370/311 |
| 2015/0244430 A1* | 8/2015 | Shattil | ............ | H04B 1/0003 370/254 |
| 2015/0270882 A1* | 9/2015 | Shattil | ............ | H04B 1/0003 370/329 |
| 2015/0303950 A1* | 10/2015 | Shattil | ............ | H04B 1/0003 370/328 |
| 2016/0227489 A1* | 8/2016 | Oteri | ............ | H04W 74/0808 |

\* cited by examiner

METHOD AND APPARATUS FOR SCALABLE LOAD BALANCING ACROSS WIRELESS HETEROGENEOUS MIMO NETWORKS

PRIORITY

The present patent application claims priority to and incorporates by reference the corresponding provisional patent application Ser. No. 62/012,893, titled, "Method and Apparatus for Scalable Load Balancing Across Heterogeneous MIMO Networks," filed on Jun. 16, 2014.

FIELD OF THE INVENTION

Embodiments of the present invention relate to the field of wireless communication; more particularly, embodiments of the present invention relate to base station resource allocation for user terminals, or other client drivers, in a wireless network.

BACKGROUND OF THE INVENTION

Cellular Massive Multiple-Input, Multiple-Output (MIMO) based on reciprocity-based channel acquisition is becoming a very attractive candidate in consideration of future radio access technologies. This is due to the promise for very large increases in throughput per unit area, especially when used over dense (small cell) deployments. Massive MIMO is also envisioned as a candidate for addressing large variations in user load, including user-traffic hotspots. One challenge of such deployments is load balancing. That is, there is a challenge associating users with cells not only based on relative signal strength from each cell, but also taking into account the relative user-traffic in the vicinity of each cell with a goal to optimize network-wide performance. Load balancing is even more challenging in emerging deployments. First, load balancing is even more important with small cells, as these are inherently less planned, and thus less regular than macro deployments, with large variability in effective-area coverage. Furthermore, emerging networks are multi-tier networks comprising tiers with base stations (BSs) having vast differences in the coverage area. Indeed, load balancing algorithms need to exploit the fact that each user can be served by multiple BSs, from multiple tiers, in order to effectively balance the network load across all tiers taking into account the fact that BSs from each tier cover different areas.

Non-uniform load distribution is considered to be a major challenge in small cell networks. If the load cannot be balanced efficiently, the performance gains that are expected as a result of the increased density of network access points (due to use of small cells) may be distributed in a very non-uniform manner within the user population. Various load balancing techniques are proposed for dynamically arranging user load across small cells. These techniques are generally designed considering traditional physical (PHY) layer approaches, where one BS serves at most one user at a certain frequency and time resource. But it is well accepted now that major gains in PHY layer are expected due to MU-MIMO and especially Massive MIMO.

Conventional downlink MU-MIMO schemes have been at the forefront of investigations in the past decade. These schemes promise spectral efficiency increases by using multiple antennas at the base-station and serving multiple users simultaneously without the need for multiple antennas at the user terminals. This is achieved by using knowledge of the channel state information (CSI) between each user and the transmitting base-station. Having CSIT (CSI available at the transmitter) allows the transmitter to precode the user streams so that each user terminal (UE) sees only its own stream. Given a base station with M transmit antennas, K single-antenna user terminals can be served simultaneously, giving roughly a multiplexing gain equal to min(M, K) with respect to a system serving a single terminal.

For the transmitter to achieve this operation reliably, it needs to have sufficiently accurate CSIT, i.e., the transmitter needs to know the channels between itself and each of the users sufficiently accurately. The techniques used for acquiring CSIT fall into two categories. The first class employs M pilots (one per base-station transmit antenna) in the downlink to allow each user terminal to estimate the channel coefficients between the user-terminal's own antenna(s) and those of the base-station. This operation provides each CSI at each receiving user-terminal (CSIR) regarding the channel between each base-station transmit antenna and the user-terminal receive antennas. The CSIR, i.e., the CSI information available at each user-terminal, is then fed back to the transmitter by use of uplink transmissions to provide CSIT, i.e., CSI at the transmitting base-station. This class of CSIT acquisition schemes have two overheads: (i) a downlink pilot overhead, which scales linearly with M (then number of antenna elements at the transmitting base-station); (b) an uplink feedback overhead, responsible for making available to the base-station the channels between each user-terminal and each base-station antenna. In the case, each user terminal has a single antenna, the uplink feedback is responsible for providing to the base-station the MK channel coefficients (complex-scalar numbers), one coefficient for each channel between each user terminal antenna and each base-station antenna. Although the uplink overhead could in principle be made to grow linearly with min(M, K), with the methods used in practice this overhead grows as the product of M and K. The downlink overhead limits the size of the antenna array, M, that can be deployed. Similarly, the uplink overheads limit both M and K, as the overheads grow very fast with respect to increasing M and K.

The second class of CSIT acquisition techniques is referred to as reciprocity-based training schemes. They exploit a property of the physical wireless channel, known as channel reciprocity to enable, under certain suitably chosen (M, K) pairs, very high-rate transmission with very efficient CSIT training. In particular, pilots are transmitted in the uplink by each user (K pilots are needed, but more could be used) and the corresponding pilot observations at the base-station are directly used to form the precoder for downlink transmission. If the uplink training and the following downlink data transmission happen close enough in time and frequency (within the coherence time and the coherence bandwidth of the channel), then the uplink training provides directly the required (downlink channel) CSI at the transmitter, since the uplink and the downlink channels at the same time and frequency are the same. In this class of techniques, the uplink overheads scale linearly with K, i.e., with the number of user terminals that will be served simultaneously. These schemes are also typically envisioned as relying on TDD (Time Division Duplex) in order to allow uplink training and downlink transmission within the coherence bandwidth of the user terminal channel with a single transceiver shared for uplink and downlink data transmission.

One attractive aspect of reciprocity-based training schemes is that one can keep on increasing the size of the transmit antenna array, M, making it "Massive", without incurring any increase in the training overheads. Although with M>K, increasing M does not increase the number of simultaneously multiplexed streams, K, (i.e., K streams are simultaneously transmitted, one to each user), increasing M induces significant "beamforming" gains on each stream (which translates to a higher rate per stream), at no additional cost in training. Alternatively, increasing M allows reducing the transmit power required to yield a target rate to a user terminal, thereby allowing for greener transmission schemes. Another advantage of Massive MIMO is hardening of the user rates, i.e. with large number of antennas, the rate that a user gets does not significantly change by small scale fading. This property allows practical load balancing and scheduling techniques for Massive MIMO deployments.

This work considers instantaneous CSIT acquisition by reciprocity based training schemes. The challenge with reciprocity based training schemes is that the "compound" uplink and downlink channels at the same time and frequency are not the same. Specifically, although the uplink and downlink physical channel components are the same, each compound channel between a "source node" (responsible for transmitting an information-bearing signal from the transmit antenna) and a destination node (attached to the receive antenna) includes additional impairments due to the transmitter (the circuitry, at the transmitter) and the receiver (the circuitry, at the transmitter). When the transmitter and receiver roles are interchanged, different impairments occur at each node, thereby rendering the two compound channels non-reciprocal. There exist various calibration techniques to calibrate receivers and transmitters so that the compound DL and UL channels are approximately reciprocal. In the following, it is assumed that reciprocity is perfectly established.

Small cell deployment in heavy traffic areas, often referred to as "hot spots," is considered as a promising solution for coping with surging traffic demands. In some deployment scenarios, the small cell layer might co-exist with the macro cell layer. Another complementary promising direction towards coping with heavy traffic demands in a power- and bandwidth-efficient manner is Massive MIMO. In Massive MIMO, the number of antennas serving users is much larger than number of users being served. In downlink Massive MIMO, for instance, many users can be served at the same time either using Zero Forcing Beamforming, or even the simpler Conjugate Beam Forming, exploiting the fact that the number of users served is far smaller than the number of antennas. As the number of antennas gets large, transmission beams get sharper, thereby achieving the desired received signal level with much lower transmitted power levels. Furthermore, with large antenna arrays, the achieved user rates harden, i.e. variance in user rate due to fast (e.g., Rayleigh) fading becomes effectively negligible.

In traditional macro cells deployments, user terminals associate themselves with the macro BS with the largest power. Although variations can arise in the traffic-load of different nearby BSs, such as e.g., in the case of hot-spots, in general such variations are relatively small due to the size and planning of the cells. In the case of smaller less-planned cells, the traffic load from one small cell to the next can exhibit much larger variations. As a result, much larger variability of the load can arise across different small BSs, if users simply associate with the BS from which they receive the strongest signal. Clearly, many BSs may be over-loaded while other nearby BSs might be serving much fewer users. Fortunately, in the case of small cell deployments, many users may be able to receive signals from several BSs as there are more BSs (on average) in proximity. As a result, many recent works consider load balancing and association methods in order to make the best out of the available resources brought by small cells.

The problem of designing good load balancing and user association techniques becomes in general more challenging in cases where more than one user is scheduled at the same time and frequency resources, i.e. with multi-user transmission schemes. Indeed, the rate each user receives in the context of a multiuser transmission scheme, such as e.g., Linear Zero-Forcing Beamforming (LZFBF), depends not only on the user's own channel, but also on the number of other users scheduled together with the user for such multiuser transmission as well as the channels of these users. The problem of scheduling user sets to maximize the sum of user rate when LZFBF precoding is applied has been considered, and a greedy algorithm for the user selection when considering a single cell with a single BS has been proposed. A technique in has been used as a building tool to schedule cellular and cluster MU-MIMO transmissions in cellular networks applying proportional fairness at each BS. These techniques can also be systematically expanded to include a broader range of fairness conditions with the framework of virtual queues in.

All of the above scheduling methods are local, in that they assume that user to BS association has already taken place, so that the fairness framework can be applied locally at each BS. Predicting a priori the effect that different user-BS associations have on the network-wide fairness provided across the network by these "locally fair" schedulers is in general non-trivial. However, when the number of antennas at the BS is much larger than the number of users instantaneously served by a BS in each transmission resource element, the instantaneous user rates "harden" (show much lower variability) and can be accurately predicted by just knowing the size of the serving set at the BS.

Reciprocity-Based Massive MU-MIMO

Consider the problem of enabling MU-MIMO transmission from an array of M transmit antennas to U single-antenna user terminals. The downlink (DL) channel between the i-th base-station transmitting antenna and the k-th user terminal is given by $$\vec{y}_{ki} = \vec{h}_{ki}\vec{x}_i + \vec{z}_{ki}$$

where $\vec{x}_i$, $\vec{h}_{ki}$, $\vec{y}_{ki}$, $\vec{z}_{ki}$ denote the transmitted signal from base-station antenna i, the compound DL channel between the two antennas, and the observation and noise at the receiver of user terminal k, respectively. This model is applicable at any resource block. In general, the variables in the above equation are resource-block dependent. This dependency is currently ignored in the notation for convenience though with an abuse of notation, it will be used when time-sharing across various resource blocks are considered. The amplitude and phase shifts introduced by RF-to-baseband conversion hardware (e.g., gain control, filters, mixers, A/D, etc.) at the receiver of user terminal k as well as the amplitude and phase shifts introduced by the baseband-to-RF conversion hardware (e.g., amplifiers filters, mixers, A/D, etc.) at the transmitter generating the signal to be transmitted by base-station antenna i are all included in the DL compound channel.

Similarly the uplink channel between the k-th user terminal and the i-th base-station antenna is given by $$\overline{y}_{ik} = \overline{h}_{ik}\overline{x}_k + \overline{z}_{ik}$$

where $\bar{x}_k$, $\bar{h}_{ik}$, $\bar{y}_{ik}$, $\bar{z}_{ik}$, denote the transmitted signal from user terminal k, the compound uplink (UL) channel between the two antennas, the observation and noise at the receiver of base-station antenna i, respectively. The amplitude and phase shifts introduced by RF-to-baseband conversion hardware (e.g., gain control, filters, mixers, A/D, etc.) at the receiver of base-station antenna i as well as the scalar (complex) coefficient $\bar{t}_k$ contains the amplitude and phase shifts introduced by the baseband-to-RF conversion hardware (e.g., amplifiers filters, mixers, A/D, etc.) at the transmitter generating the signal to be transmitted by user terminal k are all included in the compound UL channel.

In the uplink, the following model may be used:

$$\bar{y} = \bar{\bar{H}} \bar{x} + \bar{z}$$

where $\bar{x}$ is the vector of dimension K×1 (i.e., K rows by 1 column) comprising the user symbols on subcarrier n at symbol time t, $\bar{\bar{H}}$ is the M×U channel matrix that includes the constant carrier phase shifts and the frequency-dependent constant in time phase shifts due to the relative delays between the timing references of the different terminals, $\bar{y}$ and $\bar{z}$ are the received signal vector and noise at the user terminal.

In the downlink, the following model may be used:

$$\vec{y} = \vec{x}\vec{H} + \vec{z}$$

where $\vec{x}$ is the (row) vector of user symbols on subcarrier n at symbol time t, $\vec{H}$ is the U×M channel matrix that includes the constant carrier phase shifts and the frequency-dependent constant in time phase shifts due to the relative delays between the timing references of the different terminals, $\vec{y}$ and $\vec{z}$ are the received signal (row) vector and noise at the user terminals. Other BSs at sufficiently close distance cause interference as network MIMO/joint transmission/CoMP or any other interference mitigation techniques are not considered. Interference from the other access points is included in the noise term.

Assuming perfect calibration, the compound UL and DL channels become reciprocal, so that $$\bar{\bar{H}} = \vec{H}$$

For simplicity, the thermal noise is neglected. In order to estimate the downlink channel matrix, the U user terminals send a block of U orthogonal frequency division multiplexing (OFDM) symbols, such that the uplink-training phase can be written as $$\bar{Y}_{tr} = \bar{\bar{H}} \bar{X}_{tr} + \text{noise}$$

where $\bar{X}_{tr}$ is a scaled unitary matrix. Hence, the base-station can obtain the channel matrix estimate $$\bar{Y}_{tr} \bar{X}_{tr}^\dagger = \bar{\bar{H}} + \text{noise}$$

In order to perform downlink beamforming, the compound channel downlink matrix $\vec{H}$ is used.

The ZFBF precoding matrix is calculated as $$W = \Lambda^{1/2} [\vec{H}^H \vec{H}]^{-1} \vec{H}^H$$

where $\Lambda$ is a diagonal matrix with $\lambda_m$'s as diagonal elements that imposes on each row of the matrix W, the row normalization $\|w_m\|^2 = 1$, for all m.

Hence, the ZFBF precoded signal in the downlink with equal power for each beam also taking account a distance-dependent pathloss model with the diagonal matrix matrix G, whose diagonal elements are $g_i$'s.

$$\vec{y} = \vec{u} p^{1/2} G^{1/2} W \vec{H} + \vec{z}$$
$$= \vec{u} p^{1/2} G^{1/2} \Lambda^{1/2} [\vec{H}^H \vec{H}]^{-1} \vec{H}^H \vec{H} + \vec{z}$$
$$= \vec{u} p^{1/2} G^{1/2} \Lambda^{1/2} + \vec{z}$$

$$\lambda_k = \frac{1}{\left[\left(\vec{H}^H \vec{H}\right)^{-1}\right]_{k,k}}$$

Notice that the resulting channel matrix is diagonal, provided that S≤M.

Prior Art on MU-MIMO User Scheduling

Although there several methods available in the literature for scheduling multi-user MIMO transmissions at the BS, a widely accepted class of methods involves scheduling policies which, at any given scheduling instant at the BS, schedule the subset of users that would yield the highest expected weighted sum-rate. Each user's expected rate in each scheduled set for transmission is a function on the instantaneous channels of all the users in the scheduled set. Indeed, assuming LZFB transmission as described in the preceding section, at any given resource block the coefficients $\lambda_k$'s depend on the instantaneous channel matrix of all users in the scheduling set (served by ZFBF), and in particular, they can be expressed as $$\lambda_{k,S}(t) = \frac{1}{\left[\left(\vec{H}_{k,S}^H(t)\vec{H}_{k,S}(t)\right)^{-1}\right]_{k,k}},$$

where $\vec{H}_{k,S}(t)$ denote the compound downlink channel matrix for $UE_k$ in the user set S at the t-th resource block. Clearly, since the choice of the user set S and/or resource block (t) affects $\lambda_k$, the expected user rates are a function of both the scheduling set and the instantaneous channel realization. Fixing the scheduling time instance, and assuming LZFBF transmission, the problem of choosing the subset S which maximize the weighted sum-rate is combinatoric in the number of antennas, as the number of possible subsets, S, that can be considered for scheduling grows exponentially fast with the maximum number of users that can be considered for joint scheduling. One solution to this problem has been proposed that relies on a greedy algorithm for user set selection, with at most quadratic complexity.

Another important factor defining the scheduling assignments that are produced by the scheduling policy is the method by which the "user weights" are chosen at each scheduling instant prior to performing the weighted sum rate maximization operation. Although many methods exist for choosing these weights, a widely accepted class of methods (because of their ability to result in nearly optimal performance with respect to a fairness criterion belonging to a broad class of fairness criteria) is one that relies on the use of "virtual queues" to determine the instantaneous user-weights in the weight-sum rate optimization.

Prior Art on Load Balancing

Traditionally, association in cellular networks has been user-terminal based. Users measure their signal-level with respect to the beacons of the nearby BSs and associate to the base-station with the strongest received signal. A generalization of this principle has been used in heterogeneous networks. In the case of comparing signal strengths from a macro and a small cell, a user-terminal can also apply a "bias" to favor association to the small cell (with respect to the macro cell).

As traffic-load imbalances are far more pronounced in small cells, there has been some recent work in load balancing in small cells. Indeed, small cells are much more sensitive to the cell association policy because of the non-uniformity of cell size, and the smallest average number of users they serve. This non-uniformity can result in extremely imbalanced traffic-load based on a max-SINR cell association. The prior art in this area mainly involves methods of exchanging information between each user and nearby BSs, which attempt to balance their load using signaling exchanges with nearby users. Another related technique, referred to as "cell breathing," relies on dynamically changing (contracting or expanding) the coverage area depending on the load situation (over-loaded or under-loaded) of the cells by adjusting the cell transmit power. Also note that these works focus on small cells scheduling only single-user transmissions.

Limitations of the Previous Works

The methods described above have important limitations. First, given that the user rates in a MU-MIMO, transmission are not simply a function of large-scale signal-to-interference plus noise ratio (SINR), but in general depend on the scheduling set and the channel realization, the resulting load-balancing techniques are not extendable in any straightforward resource-efficient manner. Furthermore, the nature of reciprocity-based Massive MIMO TDD makes large scale SINR in a link between a user and all BSs in proximity available given a single uplink pilot broadcast from the user. In this context, the association (if any) of a user to a BS can be performed by centralized processing among the BSs without involving exchanges with the users. Using a central controller to fully perform load-balancing among the BSs as well as schedule transmission at each of the BSs is, however, computationally intractable.

Techniques for load balancing and scheduling by use of a combination of processing and information sharing between a central controller and a set of BSs have been put forth. The methods leverage properties of "massive MIMO" type transmission to enable achieving near-optimal scheduling and load-balancing performance in Massive MIMO cellular transmission. These methods are suitable for performing load balancing by use of a central controller balancing the load across a group of base-stations. However, these techniques are not readily area-scalable as they rely on a single central controller allocating resources over the network over which load balancing is performed. To illustrate the fact that these schemes are not readily scalable, assume for a moment that the average density of the BSs, and user-populations is fixed. Increasing the area over which load balancing is performed results, at best, in a linear increase of the number of optimization variables with coverage area. This is because increasing the coverage area results in a linear increase in the number of users that need to be associated with the various base-stations covering the area. Hence these techniques are limited to balancing the load in a given, confined, geographical area.

SUMMARY OF THE INVENTION

A method and apparatus is disclosed herein for loading balancing across wireless networks is described. In one embodiment, the method comprises receiving, by at least one of the one or more controllers, from at least one of the one or more base stations, information indicative of a rate that can be provided by the at least one base station to at least one client terminal by the at least one base station when serving a group of one or more client terminals, the at least one client terminal being associated to the at least one controller; receiving, by the at least one of the one or more controllers, from the at least one of the one or more base stations, information indicative of the transmission resources provided by the at least one base station for resource allocation among the at least one client terminal by the at least one controller; and determining, by the at least one controller, based on the information indicative of the rate and the information indication of transmission resources, information indicative of an allocation of base station transmission resources for at least one client terminal from the at least one base station.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
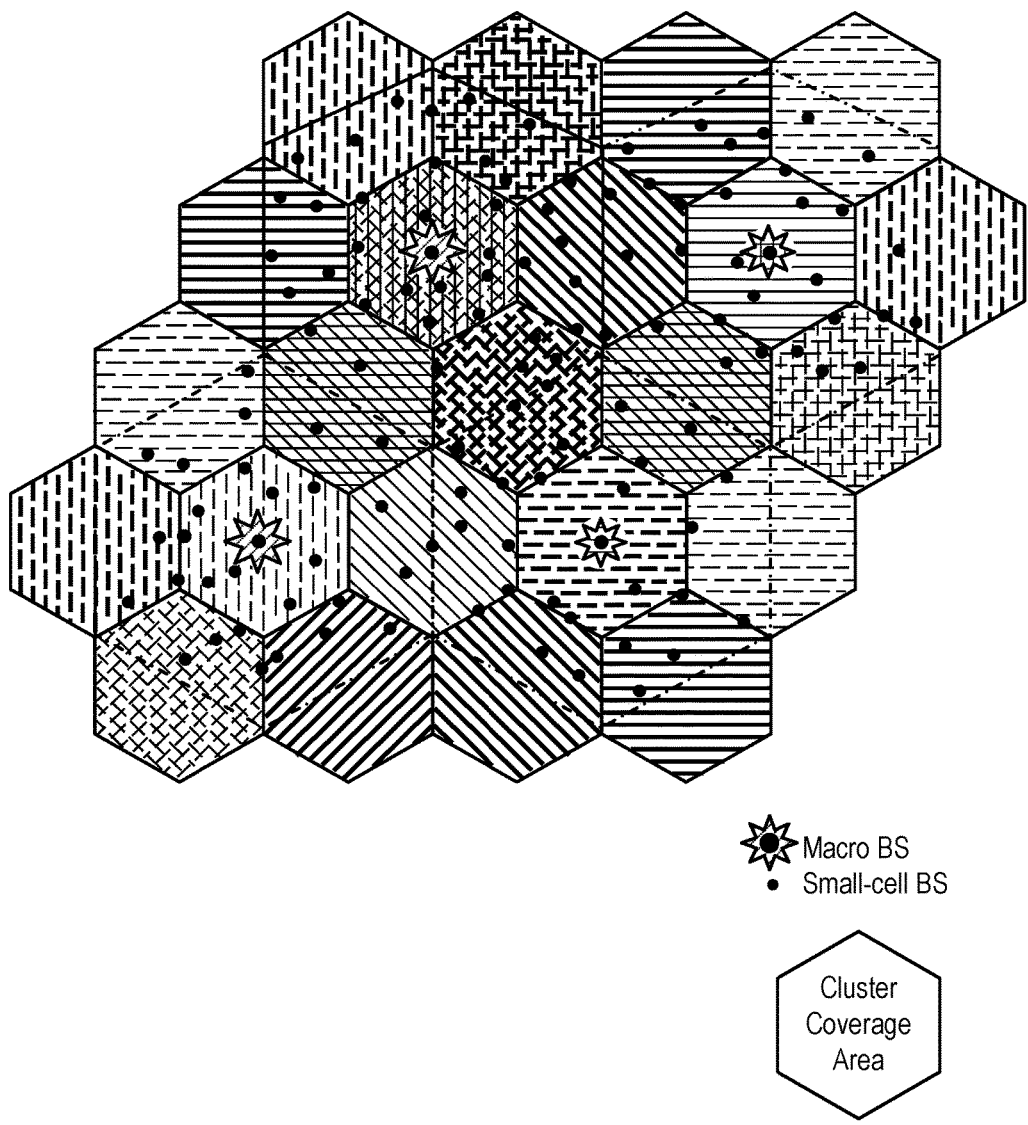
FIG. 1 illustrates HetNet layout and illustrative tessellation of the geographical area into regions covered by different clusters.

Embodiments of the invention include methods and apparatuses for load balancing in single and multi-tier wireless networks involving tiers with cells of different sizes. Although embodiments of the invention are for use with Massive MIMO deployments exploiting reciprocity based single-user and multiuser-MIMO transmission, the techniques described herein can be used in other wireless networks, including those without massive MIMO and without reciprocity-based training.

The techniques set forward herein are not limited to load balancing over a confined area. In particular, they rely on a newly disclosed architecture for user association and load balancing, which readily enables methods that scale over large geographical areas and over multi-tier networks very efficiently. Furthermore, these techniques can be readily implemented with BS-centric user-to-BS association methods, as well as with the traditional user-centric association methods.

Methods and apparatuses that allow scalable load balancing and scheduling over networks involving cellular massive MIMO transmission are disclosed. The architectures and associated techniques can be used for providing efficient and scalable operation over single- and multi-tier wireless networks. Examples of these networks include small cells, macro cells or heterogeneous deployments.

Embodiments of the invention enable network-wide load balancing together with user association and scheduling by exploiting an architecture in which network resources are partitioned across overlapping sets of clusters of BSs. In particular, each cluster comprises a subset (or all) of the BSs from one or more tiers that can serve users in a given geographical area. Each user can be readily associated with a cluster serving its geographical area. In this architecture of overlapping clusters, each BSshares its resources across all the clusters to which it belongs. Load balancing is accomplished by having the resources of each BSshared across the clusters, and by having each cluster allocate the resources of its BSs in accordance with the traffic load in the cluster. This allows sharing resources conveniently in single-tier but also HetNet deployments. Indeed in HetNet deployments, in one embodiment, macro-BSs are included in (and thus share their resources across) many more clusters than small-cell BS.

Load balancing within each cluster can be performed with an appropriate extension of the methods in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014, appropriately modified to account for the fact that only a fraction of each BS's resources are available to be shared among users served by the given cluster. In one embodiment, user rates are optimized with respect to a cluster-wide objective function (capturing fairness and performance in a single metric) subject to the available transmission resources provided to the cluster by each of the BSs in the cluster. In one embodiment, this cluster-wide objective function is optimized based on assigning appropriate "activity fractions" to each user from each BS in the cluster, but is otherwise independent of the instantaneous scheduling sets within the cluster. In one embodiment, the rate of each user served by the cluster is tied to the activity fractions of the user from each of the BSs in the cluster. In one embodiment, these user activity fractions are returned by a load-balancing algorithm and are to be used during the scheduling phase associated with the time interval over which these fractions apply. These activity fractions returned by the load-balancing algorithm in any given cluster are then shared with the respective BSs in the cluster. Each BS collects the activity fractions provided to it by all the clusters of which it is a part and in turn uses them to schedule (single or) multiuser transmission to user sets for each of the scheduling instance, such that over the given time duration over which these fractions apply each user's activity fractions from the BS match the ones that were provided by the load balancing algorithm outputs from the associated clusters.

In one embodiment, the user-BS activity-fraction optimization operation requires as input information indicative of the peak user rates that can be provided to each user by each BS that can serve the user, such as the large-scale fading characteristics between users and BSs (which change slowly over time). Methods disclosed herein enable iterative and/or dynamic (adaptive) load balancing of resources across the network. In one embodiment, in each cluster, a load-balancing "solution" (resource-allocation of activity fractions across user-BS pairs) can be performed based on the transmission resources allocated by each BS in the cluster. In turn, given a load balancing "intermediate solution candidate," an improved solution can be obtained by having each BS redistribute its transmission resources across the clusters in which it participates to improve or better balance its load across the user subsets its serves. Scalable on-line load-balancing methods, which are updated from a given interval to the next interval, are also direct extensions. In this case, in one embodiment, each BS uses the preceding-interval load-balancing solution (that has been shared by its clusters), together with updated load-variation information provided by each cluster (e.g., a predicted BS-load from each cluster indicative of the load form the user equipment (UE) population in the cluster that may be served by the given BS) to redistribute its transmission resources across the clusters in which it participates to improve or better balance its load across the user subsets its serves. The updated transmission resources at each BS are then used by each cluster controller to obtain next-interval load-balancing solution.

Methods and apparatuses disclosed herein set forth allow load balancing and network-wide optimization based on a broad range of fairness criteria. In addition, although embodiments of the invention are presented in the context of reciprocity-based massive MIMO, the techniques disclosed herein can also be applied with feedback-based MIMO techniques, with small or large-scale MIMO.

Methods disclosed herein for associating users with small cell BSs or access points (APs) enable scalable load balancing performance by exploiting this hardening effect.

Embodiments of the invention have one or more of the following advantages with respect to the previous scheduling and load balancing approaches.

1. Embodiments of the invention allow scalable, robust, and practical load balancing across multi-tier wireless networks with massive MIMO deployments.
2. Embodiments of the invention are compatible with user-centric, BS-centric, and or hybrid user-to-BS association methods.
3. Embodiments of the invention simplify the load-balancing problem and enables flexible scheduling at each BS.
4. Embodiments of the invention readily allow adaptive load balancing and resource allocation across the wireless network. Load balancing among clusters is performed by use of the resource-allocation from each BS to its clusters, which changes over large time-scales (even in the order of minutes). Also "cluster hand-offs" can be performed at a much slower time scale than conventional hand-offs, and since the clusters are overlapping, there is a longer time-window for performing these hand-offs.
5. The methods described herein can also be used to enable a broad range of MU-MIMO deployment schemes, including coordinated multipoint transmission, whereby user terminals are not necessarily served by the same BS all the time.
6. The methods described herein enable TDD based MU-MIMO with BS-centric association. Users are associated with a cluster, but do not need to know which BS or BSs in the cluster are serving them. All UEs need to know is at which time slot they are being served and when they should transmit their respective uplink pilots.

7. Embodiments of the invention also allow user-centric association of users to (load-balancing) clusters. Embodiments of the invention also allow the association of users to BSs within the cluster to be user-centric or cluster-centric.

Embodiments of the invention include methods and apparatuses for balancing the load in a wireless HetNet network in a scalable and resource-efficient manner. Embodiments of the invention can be readily applied to perform load balancing over multi-tier networks with massive-MIMO small cells. It enables resource-efficient practical and dynamically adapted load balancing, together with low-overhead user scheduling for reciprocity-based MU-MIMO transmission.

Embodiments of the invention optimize network operation for reciprocity-based MU-MIMO over TDD single- and multi-tier deployments with large antenna arrays and large number of users. It allows load balancing across all tiers and all cells and can enable thus high multiplexing gains for all users across the network in a fair fashion. It can also be operated under the LTE fabric.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of this invention include practical scalable load-balancing methods that enable efficient and robust operation of single- and multi-tier wireless networks with small, large-scale, and/or massive MIMO deployments. At least one method relies on a load-balancing architecture that is comprised of overlapping clusters of BSs. Users are associated with clusters as opposed to BSs. Each cluster nominally serves a user population over a given geographical area according to the load balancing solution provided by the cluster controller. Each cluster may include BSs from one or multiple tiers, with each BS covering a different area and with BSs in different tiers having coverage areas of (possibly) vastly different sizes. In one embodiment, each BS is part of one or (preferably) multiple clusters, and shares its transmission resources across all the clusters it belongs. Naturally, as macro-cells have a much larger coverage area than, e.g., small cells, they are included in (and share their transmission resources over) a much larger number of clusters than small cells. As a result, a macro BS in general may contribute a small fraction of its resources to each of the clusters of which it is a part. In one embodiment, the architectures do not require any ad-hoc small-cell "bias" to favor association with small cells. Indeed, this is implicitly performed in a more systematic way, as the cluster controller performs load-balancing in each cluster based on the transmission resources provided to the cluster by each of the BSs (small and large) it includes.

FIG. 1 shows an illustrative example involving a hexagonal layout of macro cells together with a set of irregularly deployed small cells. Referring to FIG. 1, a HetNet layout is shown along with an illustrative tessellation of the geographical area into hexagonal user regions covered by different clusters. The cluster controller serving any given hexagon determines the fractions of the transmission resources to be allocated by different BSs to the users residing in the hexagon. Both macro BSs and small-cell BSs are shown.

Figure 2:
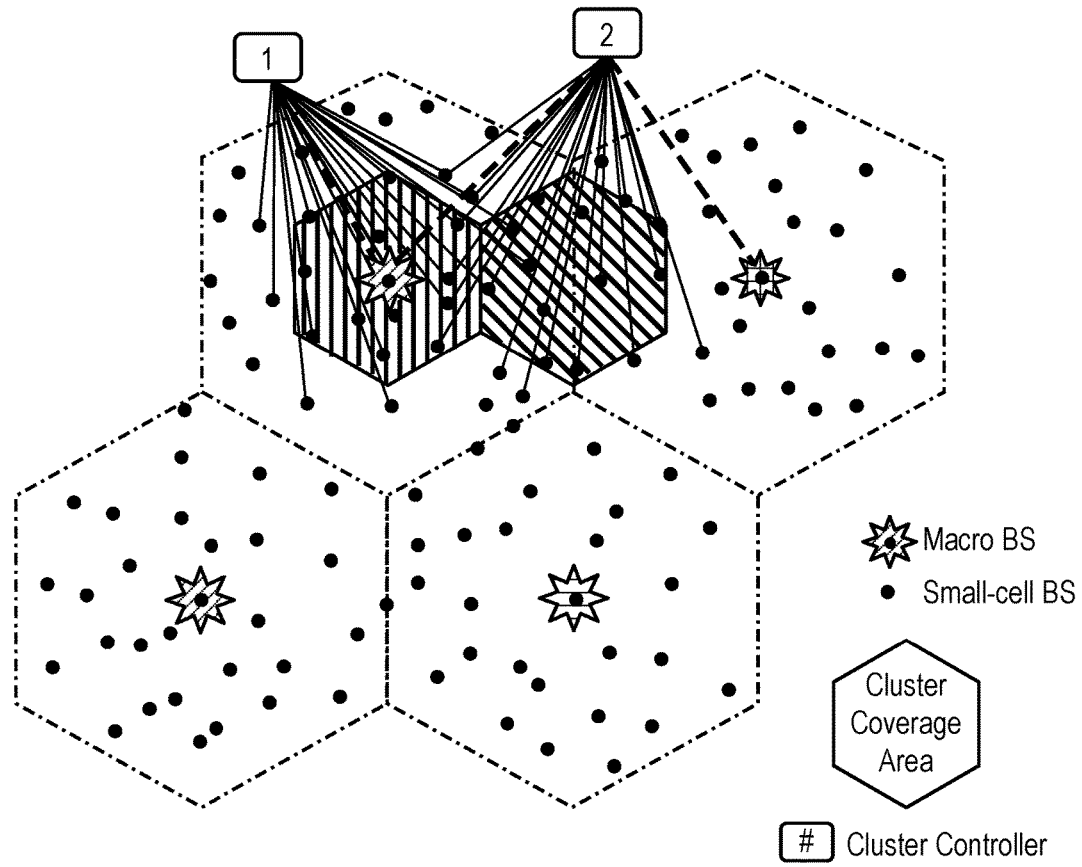
FIG. 2 illustrates two cluster controllers assigning fractions of base station (BS) resources, each to the users in corresponding areas.

FIG. 2 considers two of the hexagonal user regions and shows a cluster controller in each area. Each cluster controller (e.g., cluster controllers 1 and 2) is connected by an edge in FIG. 2 to a subset of small and macro BSs. Each of these BSs allocate to the cluster controller a fraction of their transmission resources, along with information indicative of the rates each BS can provide to each of the user terminals in its vicinity. Based on this information, the cluster controller determines user-BS activity fraction allocations for each user associated with the given cluster (residing in the corresponding hexagonal area). In turn, each BS collects the user-BS activity fraction allocations provided by all its clusters (i.e., all the clusters to which the BS provided transmission resources) and uses them to schedule users for transmission. In one embodiment, the method by which the user-BS activity fractions are used to schedule user transmissions in each BS is described in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014.

Note that, in one embodiment, the load balancing solution, i.e., the resource allocations of BS resources to UEs, has to be re-updated periodically, since users move and the traffic load distribution changes over time. In one embodiment, each BS uses the information provided to it by its cluster controllers to adapt and better allocate its transmission resources among its clusters in the following load-balancing cycles. In one embodiment, each controller passes to each base-station activity fractions for the users in from that cluster that the BS needs to allocated resources. These are the $a_{k,j}^{(n)}$ discussed below. In turn, each BS uses the set of such resources provided by its controllers to reallocate its resource split among its controllers. This is done by solving the problem discussed below where the constraint values $\Gamma_{j_o}^{(n)}$, $R_{k,j_o}^{(n)}$ $f_{j_o,g}^{(n)}$ are determined from the $a_{k,j}^{(n)}$ as described below.

Embodiments of the architectures disclosed herein enable performing network-wide load balancing via the combined action of the following:
  i. BS-to-clusters resource balancing: allocation by each BS of its transmission resources across the clusters of which it is a part.
  ii. Intra-cluster load balancing: allocation by each cluster controller of the transmission resources provided by its BSs among the users associated with the given cluster.

Figure 3:
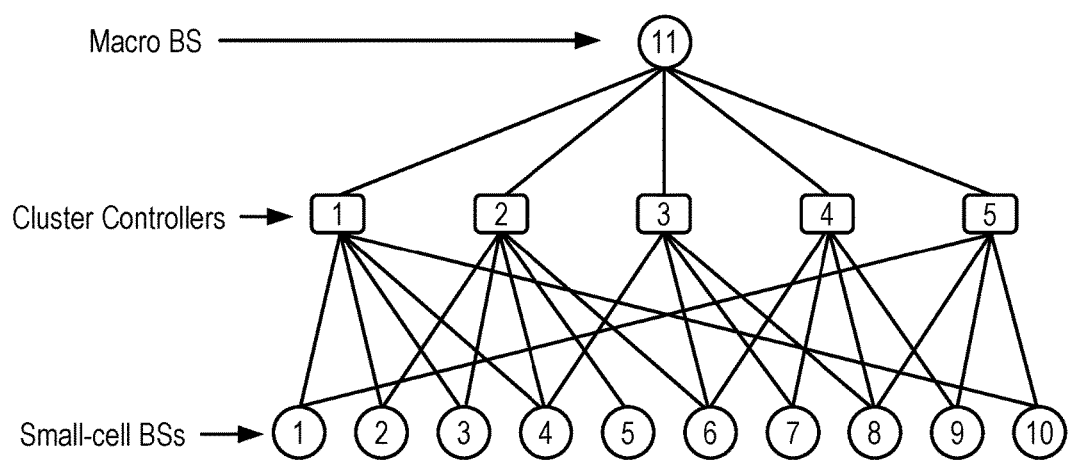
FIG. 3 illustrates a bipartite graph between BSs and cluster controllers for a 1D example of a load-balancing architecture.

The bipartite graph in FIG. 3 provides a pictorial illustration of the methods enabled by the architectures disclosed herein. Referring to FIG. 3, the bipartite graph between BSs and cluster controllers for 1-D example of a load-balancing architecture involve 10 small BSs and 1 macro (J=10+1) and G=5 clusters. That is, in this example, there are 5 clusters, and 11 BSs (10 small cell BSs and 1 macro). Each cluster controller is responsible for allocating resources to the UEs associated with the cluster, by allocating the transmission resources provided by the BSs to which the cluster controller has an edge. That is, each edge between a BS and a controller denotes that the BS shares a fraction of its resources to serve user associated with the given cluster. For instance, the 3rd cluster is served by the 3rd controller. The 3rd controller is provided transmission resources by BSs 4, 6, 7, 8, and 11, and it uses them to perform intra-cluster load-balancing, i.e., to suitably partition the resource provided to the controller by the BSs 4, 6, 7, 8, and 11 among the users associated with the 3rd cluster. Similarly, each BS splits its resources across all the clusters of which it is part. For example, BS 1 splits its transmission resources between the 1st and 5th clusters, while the macro BS 11 splits its resources among all five clusters. This resource balancing from each BS to its clusters is based also on the information provided by the effective load information that is provided to each BS by each of the clusters to which it is connected.

Intra-cluster load balancing comprises balancing the load within the given cluster by use of processing performed by the associated cluster controller. In one embodiment, each cluster controller performs load balancing across its network via an extension of the network-wide load-balancing techniques set forth in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014. As set forth therein, embodiments of the invention allow the separation of load balancing and user scheduling for the multi-user transmission. In one embodiment, the cluster controller optimizes the load across the cluster BSs (based on the transmission resources allocated to the cluster by each BS). Each BS obtains the resource allocation provided to it by each of the controllers controlling the clusters where the BS belongs, and uses the "aggregate" activity fractions to control its own scheduling policy and pilot assignments for users according to the user activity fractions chosen by the cluster controllers, e.g., by the methods described in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014.

Figure 4:
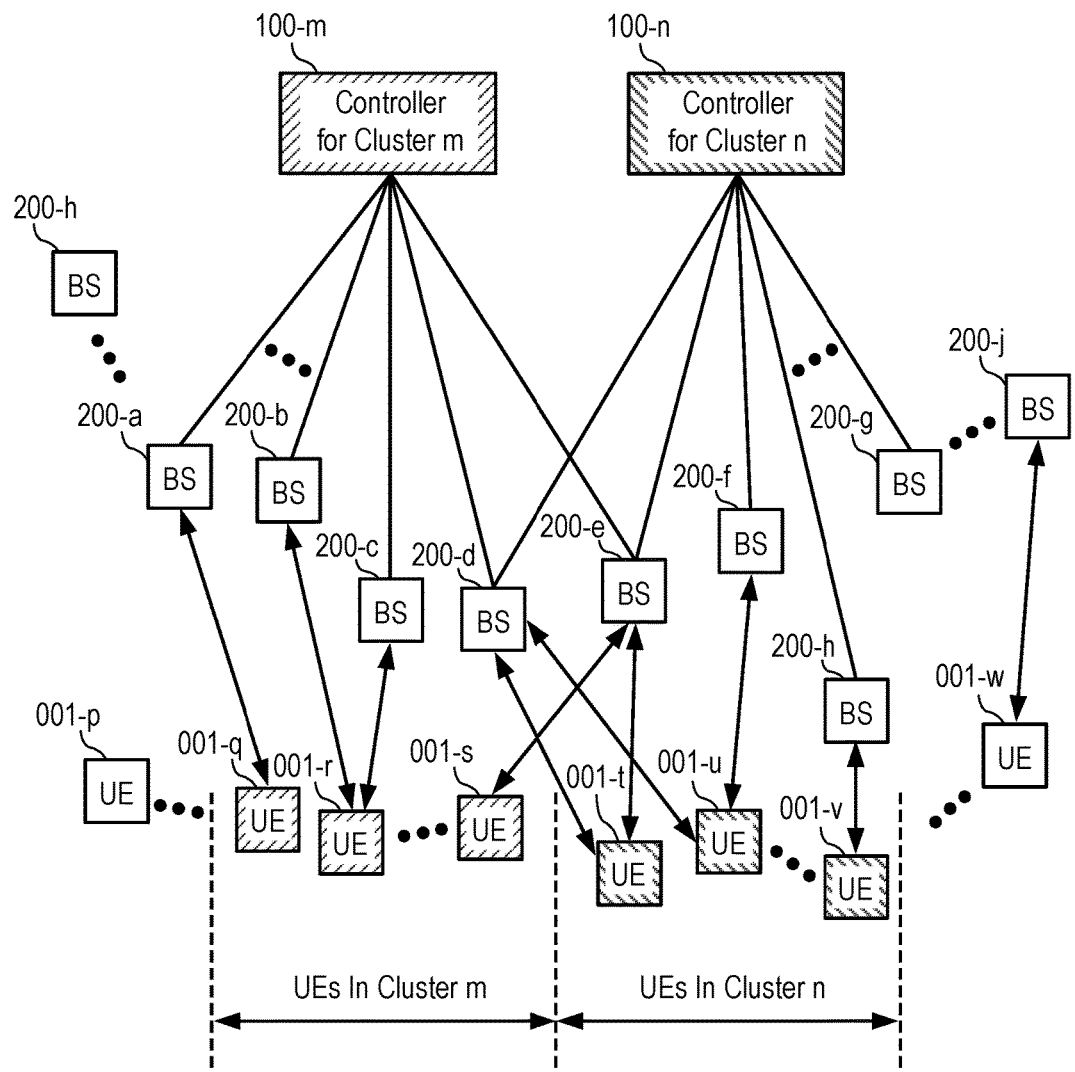
FIG. 4 illustrates a part of a wireless network over which the load balancing methods can be applied.

FIG. 4 shows a wireless network with J BSs and K UEs. Referring to FIG. 4, there are G controllers, and each is responsible for intra-cluster load balancing over a cluster of UEs. Two such sample cluster controllers, controller units 100-*m* and 100-*n*, perform intra-cluster load balancing over UE clusters m and n, respectively. BSs 200-*a*, 200-*b*, 200-*c*, 200-*d*, and 200-*e* provide some of their transmission resources to cluster controller m. These resources are to be split by cluster controller m among UEs 001-*q*, 001-*r*, 001-*s* and the rest of the UEs in cluster m via the intra-cluster load balancing performed by controller m. Similarly, BSs 200-*d*, 200-*e*, 200-*f*, 200-*g*, and 200-*h* provide some of their transmission resources to cluster controller n. These resources are to be split by cluster controller n among UEs 001-*t*, 001-*u*, 001-*v* and the rest of the UEs in cluster n via the intra-cluster load balancing performed by controller n. To accomplish this, each cluster controller obtains cluster state information from its BSs. In one embodiment, this information includes, but is not limited to, large scale fading channel conditions between each BS and UE in the cluster, buffer, traffic and load information of UEs in the cluster, application and delay constraints of UE streams, load balancing options, etc. In one embodiment, each of the cluster controller units 100-*m* and 100-*n* independently chooses the activity fractions and sends this information to its BSs. In one embodiment, each cluster controller unit also sends delay constraints or various scheduling options to its BSs. For examples of delay constraints and scheduling options, see D. Bethanabhotla et al., PCT Patent Application No. PCT/US2014/06823. In one embodiment, the cluster controller unit sends additional information indicative of the load to each BS (e.g., quantities $f_{j_o,g}^{(n)}$ discussed below). In one embodiment, the quantities can be computed fully at the BS or with the help (partially) by the controller. Each BS may use this form of information as is shared by all its clusters to re-update its allocation of transmission resources across the clusters of which it is a part. For example, BS 200-*d* may take into account information provided by cluster controllers unit 100-*m* and 100-*n* (and other units to which it is connected) to reallocate its transmission resources across these BSs. The activity fractions (as well as the other information) provided to a BS by its cluster controllers can then be used by the BS to schedule UEs in a manner similar to the one described in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014.

Figure 5:
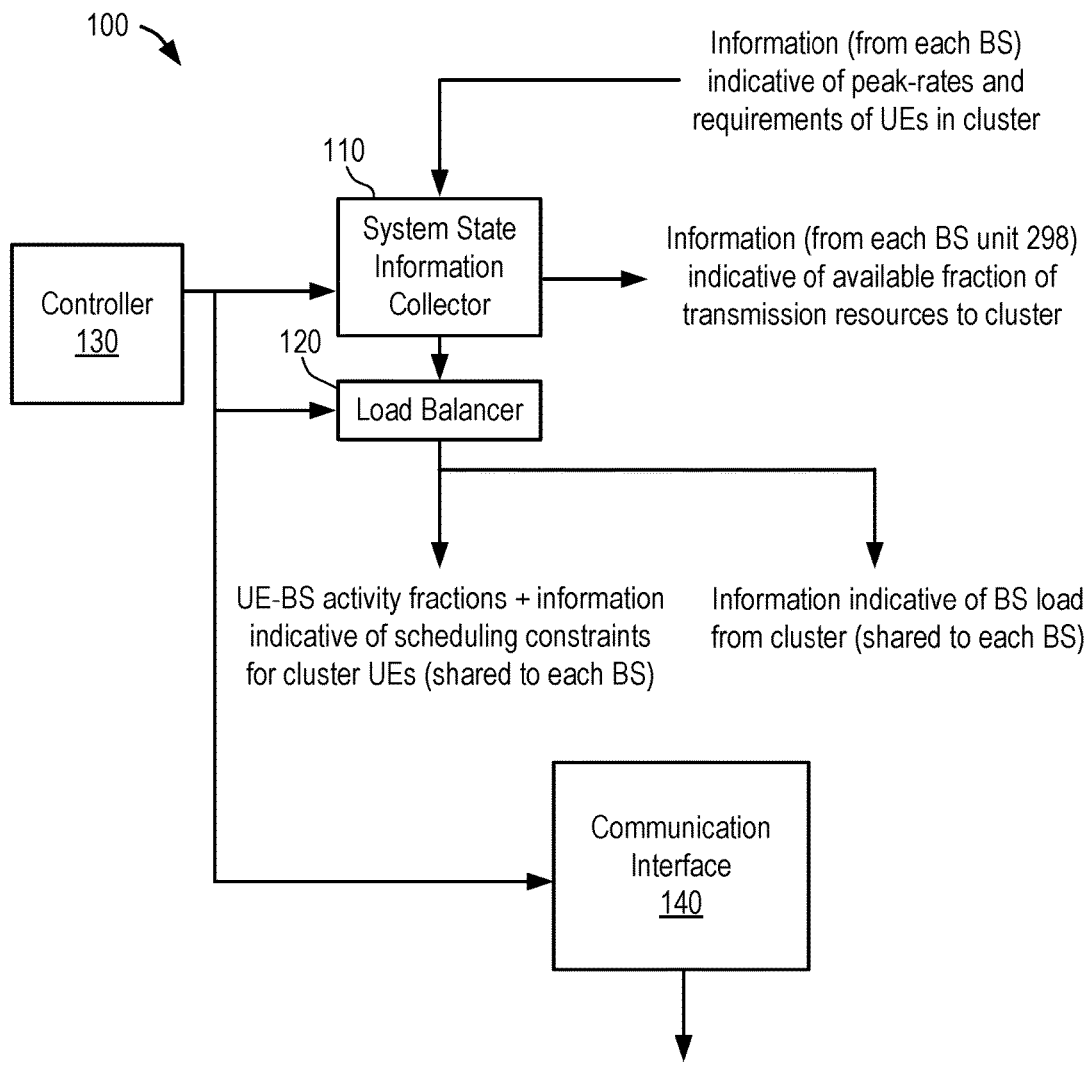
FIG. 5 is a block diagram of a portion of a sample cluster controller apparatus.

FIG. 5 is a block diagram of one embodiment of a cluster BS controller 100. Referring to FIG. 5, cluster BS controller 100 includes a system state information collector module 110. Cluster BS controller 100 also includes a load balancer unit 120. Load balancer unit 120 calculates the user-BS activity fractions. In one embodiment, these are determined using the collected information and some notion of fairness captured by use of an objective function. In one embodiment, system state collector 110 receives information from each BS indicative of peak-rates and requirements of UEs in the cluster and information from each BS is indicative of an available fraction of transmission resources to the cluster. In one embodiment, the objective function is from the class of $\alpha$-fairness functions for some $\alpha \geq 0$. For examples of $\alpha$-fairness functions that can be used, see J. Mo and J. Walrand, "Fair end-to-end window-based congestion control," *IEEE/ACM Transactions on Networking (ToN)*, vol. 8, no. 5, pp. 556-567, 2000. These activity fractions do not necessarily specify any scheduling sets, but rather give the fraction of resources for each BS, where the BSschedules a specific user in a specific set size. Given these fractions, various scheduling sets can be chosen by each BS in its scheduler 216 as shown in FIG. 6.

In one embodiment, load balancer unit 120 outputs UE-BS activity fractions and information indicative of scheduling constraints for cluster UEs, which is shared with each BS. In one embodiment, load balancer unit 120 generates and sends to each BS information indicative of the BS load. Cluster controller 100 includes a communication interface 140 to communicate this information with each BS.

A controller 130 controls the operations of cluster controller 100.

Figure 6:
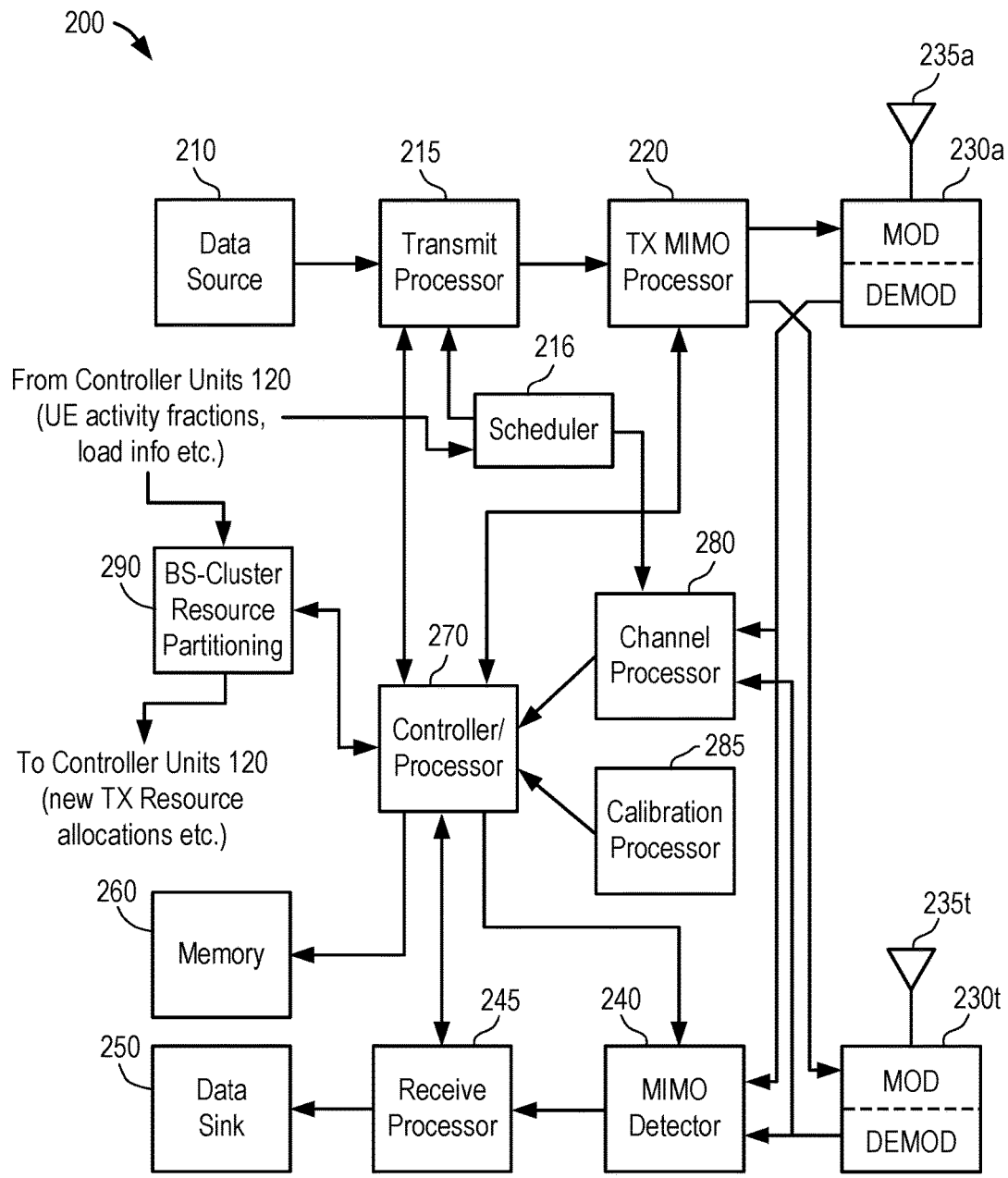
FIG. 6 illustrates a BS apparatus, including a scheduler unit taking input from cluster controller units, and a unit for partitioning BS TX resources among its clusters.

FIG. 6 is a block diagram of one embodiment of a BS 200. Referring to FIG. 6, BS 200 includes standard modules for MIMO wireless transmission. A transmit processor 215 at BS 200 receives data for one or more UEs from a data source 210, processes the data for each UE and provides data symbols to all UEs. Processor 215 also receives and processes control information from a controller/processor 270 and provides control symbols. Processor 270 also generates reference symbols for one or more reference signals. A transmit (TX) MIMO processor 220 performs precoding on the data symbols, the control symbols, and/or the reference symbols for each UE as well as for reference signals for antennas co-located at the same BS 200 or to other wireless entities such as other BSs, RRH's, etc.

Processor 220 provides parallel output symbols streams to modulators, MODS (230a through 230t). Each modulator 230 further processes (e.g., convert to analog, amplify, filter, and upconvert) the output sample stream to obtain a downlink signal. The downlink signals from modulators 230a through 230t are transmitted via antennas 235a through 235t, respectively.

At BS 200, the uplink signals from various UEs or by other antennas, collocated at the same BS 200 or located at different BSs or other wireless entities received by antennas 235a through 235t and demodulated by demodulators (DEMODs 230a-230t). The demodulated signals may be detected by MIMO detector 240 and further processed by a receive processor 245 to obtain decoded data and control information sent by UEs and other wireless entities. Receive processor 245 receives detected signals from MIMO detector and provides decoded data to a data sink 250 and control information to the controller/processor 270. The demodulated signals output by DEMODs 230a through 230t are also provided to the channel processor 280 where uplink channel is estimated and provided to the controller/processor 270.

In one embodiment, BS 200 also includes a calibration processor 285. Calibration processor 285 exchanges control information with the controller/process unit 270. Calibration processor 285 may calculate calibration values, which are used at controller/processor 270 together with UL channel estimation to construct downlink channel estimation. Downlink channel estimation are provided to TX MIMO processor 220 for precoding. Processing at calibration processor 285 involves both the signaling and data collection aspects of calibration as well as the relative calibration methods, which are based on the collected data, and, possibly additional parameters, including past relative calibration values for arbitrary subsets of the transmit antenna nodes at this and possibly other BSs.

In one embodiment, BS 200 also includes a scheduler 216. Scheduler 216 exchanges scheduling information with transmit processor unit 215. According to this information, transmit processor 215 requests the data of the scheduled users from data source 210. Scheduler 216 also provides the information of which uplink channel estimates belong to which users to channel processor 280. Scheduler 216 processes the information provided by load balancing unit 120 in central BS controller 100. In one embodiment, the information provided by load balancing unit 120 includes activity fractions, various scheduling constraints, and re-use constraints. Scheduler units of different BS may communicate to each other in order to enable feasible, non-overlapping transmissions at each instant.

Figure 7:
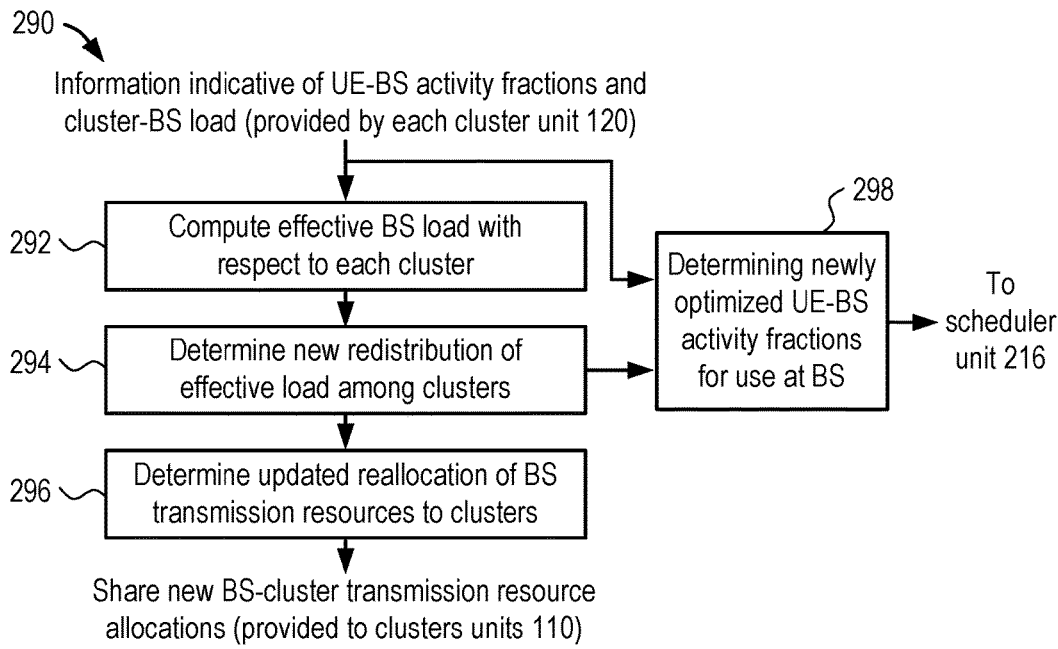
FIG. 7 illustrates resource partitioning allocation unit.

In one embodiment, BS 200 also includes a BS-cluster resource partitioning unit 290, which determines the transmission resource allocation of the BS across all the clusters of which it is a part. The operation of one embodiment of unit 290 is highlighted in more detail in FIG. 7. Referring to FIG. 7, BS-cluster resource partitioning unit 290 takes into account the UE-BS activity fractions (and possibly additional information indicative of the load in different clusters) as provided to it by load balancing unit 120 of each of the clusters of which it is a part. In one embodiment of an on-line dynamic load-balancing implementation, unit 290 considers additional information such information indicative of traffic variations across different clusters. Based on this information, unit 290 updates its allocation of its transmission resources across its clusters and provides the new transmission resource allocations to its clusters.

Embodiments of this invention include load balancing unit(s) 120 in combination with scheduler unit(s) 216 and with BS-cluster resource partitioning unit(s) 290, and involve both the load balancing and scheduling aspects of massive MIMO operation within the heterogeneous wireless network.

Figure 8:
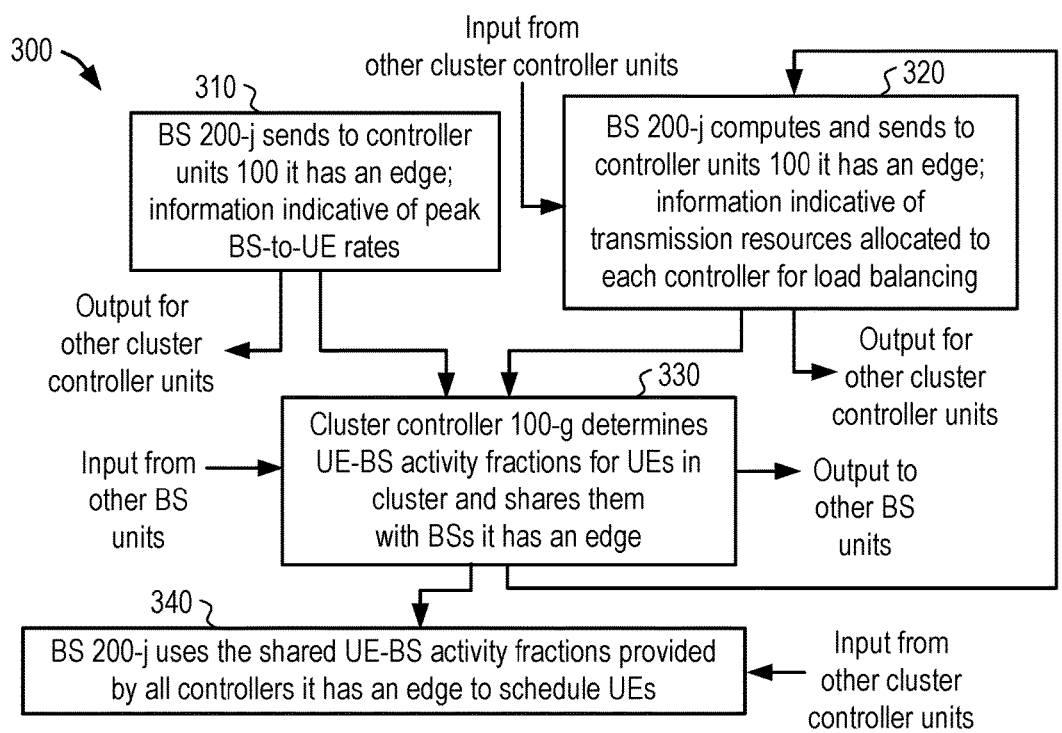
FIG. 8 illustrates a flow diagram indicating a sample cluster controller unit and a sample BS unit that are connected with an edge.

FIG. 8 is a flow diagram of one embodiment of a process for load balancing and scheduling involving a sample cluster controller unit 100-g and a sample BS unit 200-j. Referring to FIG. 8, in one embodiment, cluster controller unit 100-g and BS unit 200-j are assumed to share an edge (i.e., BS unit 200-j shares some of its transmission resources with cluster controller unit 100-j; these resources are to be allocated among UEs that can be served by BS unit 200-j). As shown in FIG. 8, BS unit 200-j (along with all other BS units 200, which are not shown in the figure) provides, to each cluster controller with which it has an edge, information indicative of the peak rates it can provide (step 310). In one embodiment, BS unit 200-j also computes and sends to the cluster controllers to which it is connected with an edge, information indicative of the allocation of its transmission resources among the cluster controllers for load balancing (step 320). Based on the information provided to cluster controller unit 100-g from all the BSs to which it is connected with an edge, controller unit 100-g determines UE-BS activity fractions, i.e. fraction of resources that are to be allocated by each BS for serving each of the UEs (step 330). BS unit 200-j then uses the shared UE-BS activity fractions shared by controller unit 100-g (and other controllers with which it is connected with an edge) to schedule UEs for transmission (step 340). In one embodiment, the information shared by controller unit 100-g and other controller units is also used by BS unit 200-j as part of a step 320, to redistribute its resources across the clusters to which it is connected with an edge for upcoming load-balancing operations. Note that step 320 may correspond to a new iteration for the same scheduling interval, or it may correspond to an updated redistribution of resource by the BS for the following scheduling interval. In that case, in one embodiment, cluster 100-g (and/or other clusters) also provides additional information indicative of the predicted load (or predicted changes in load) from the cluster to the BS. In one embodiment, such a prediction is made at a cluster by tracking variations in the number of UE in the cluster, and, possibly, their distribution across the cluster region.

System Model for Methods Described Herein

Next the load-balancing architectures and methods disclosed herein are described in detail. Without loss of generality, the focus is on the following scenario involving J BSs/APs (the terms BS and AP are used interchangeably) serving K single antenna users, spread over a potentially very large geographical area. Users and BSs are indexed by the indices k and j, respectively, with k from the user set $\mathcal{K}=\{1, 2, \ldots, K\}$ and j in the BS/AP set $J=\{1, 2, \ldots, J\}$.

Assume that $BS_j$ has $M_j$ antennas and serves user sets of size $S_j$ via (cellular) LZFB (with equal-power per stream). Also assume that $S_j \ll M_j$ so the massive MIMO approximations apply, i.e.:

a user's instantaneous rate, when $BS_j$ is serving a specific set of $S_j$ users (that includes this user), is (approx.) the same regardless of the channel realization.

a user's instantaneous rate, when the user is served by $BS_j$ in a group of $S_j$ users, effectively depends only on the value of $S_j$, and not on the identity of the other $S_{j-1}$ users.

In one embodiment, with linear zero-forced beamforming (LZFBF), the peak rate that $UE_k$ gets (i.e., the rate that the UE gets when it is scheduled for transmission) when it is served by BS, in group of $S_j$ is as follows:

$$R_{k,j} \approx \log\left(1 + \frac{g_{k,j}(M_j - S_j + 1)P_j/S_j}{1 + \sum_{i \neq j} g_{k,i} P_i}\right)$$

where $g_{k,j}$ denotes the large-scale received SNR between $BS_j$ and $UE_k$ (i.e., the ratio of the received signal power divided by the thermal-noise variance per resource element), and $P_j$ denotes the transmit power per resource element from $BS_j$.

$J_k$ denotes the set of BSs, which can serve user k (the elements in this set are, e.g., the BSs with sufficiently high large-scale SINR to user k). Similarly, $K_j$ is used to denote the set of users that can be served by $BS_j$ (the elements in this set are, e.g., the users with sufficiently high large-scale SINR from $BS_j$).

Load Balancing and Activity Fractions

For reference, a brief description of the problem solved by the methods disclosed in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014, is described below. The methods in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014, provide a load balancing solution by use of a single controller performing the load balancing optimization across all BSs. Let $a_{k,j}$ denote the activity fraction by which user k is served by $BS_j$ in LZFB transmission.

One problem solved by centralized load-balancing controller in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014:

$$\text{maximize} \sum_{k \in \mathcal{K}} U\left(\sum_{j \in J_k} a_{k,j} R_{k,j}\right) \quad \text{(Centralized a)}$$

subject to $$\sum_{j \in J_k} a_{k,j} \leq 1 \quad \forall k \in \mathcal{K} \quad \text{(Centralized b)}$$

$$\frac{1}{S_j} \sum_{k \in K_j} a_{k,j} \leq 1 \quad \forall j \in J \quad \text{(Centralized c)}$$

$$a_{k,j} \geq 0 \quad \forall k \in \mathcal{K}, \forall j \in J_k \quad \text{(Centralized d)}$$

The function U in (Centralized a) captures a notion of "fairness". In one embodiment, the function U is from the class of α-fairness functions for some $\alpha \geq 0$. For instance, proportional fairness is obtained, if a is chosen equal to 1. Also in the case $\alpha \to \infty$, the "Hard Fairness criterion is obtained, whereby the objective function to be maximized in (Centralized a) becomes the minimum among all the provided user rates.

A brief explanation of the constraints:

The set of inequalities (Centralized b) reflects that each user's total activity fraction (over all BSs) cannot be more than one (achieving the bound with equality means that a user is served in every resource element by one of the BSs).

The constraints in (Centralized c) reflect the fact that the sum activities of all the users being served by $BS_j$ cannot exceed $S_j$ i.e., $S_j$ times the total available transmission resources (this is because $BS_j$ serves $S_j$ at a time).

Note that, for any set of activity fractions satisfying the constraints (Centralized b)-(Centralized d), it is possible to obtain scheduling assignments (over a sufficiently large number of resource blocks) for scheduling users for cellular transmission, so that, for each k and j, user k is scheduled for transmission by $BS_j$, in about $(100 \times a_{k,j})$ the % of the resource blocks scheduled by $BS_j$. Consequently, in one embodiment, the rate provided to user k by the network of BSs, by such a scheduling policy is given by $$\bar{R}_k = \sum_{j \in J_k} a_{k,j} R_{k,j}$$

Note that, although each user is associated and served by a single BS (and where, for any given k, we have $a_{k,j} > 0$, only for single value of j), it also allows the use of scheduling strategies where a user may be fractionally served by multiple BSs, i.e., it may get different fractions of its total rate from multiple BSs (being served in distinct resource blocks in each case). Furthermore, although the unique user-BS association constraint is practically attractive, its relaxation to allow fractionally served users described by the set (Centralized a)-(Centralized d) corresponds to a convex problem. And although the solution of the set (Centralized a)-(Centralized d) may point to a "fractional association," such a solution is feasible (implementable), in that, there exist deterministic scheduling rules schedule each user so that the user activity fraction's to each BS comply with the solution of the set (Centralized a)-(Centralized d), and the user is not scheduled by multiple BSs in the same resource block.

In principle, the problem the set (Centralized a)-(Centralized d) can be solved by existing general-purpose convex optimizers or special purpose methods; see e.g., D. Bethanabhotla et al, "User Association and Load Balancing for Cellular Massive MIMO," in Proc. of Inform. Theory and Applications Workshop, ITA 2014, San Diego, Calif.; available at http://ita.ucsd.edu/workshop/14/files/paper/paper_1660. pdf.

A motivation for considering scalable load-balancing algorithms is evident when one considers the computation complexity of such algorithms as the coverage area over which load balancing takes place expands. Assuming for a moment that the average density of the BSs, and user-populations is fixed, increasing the area over which load balancing is performed, results in a linear increase of the number of free variables with coverage area. In particular, given that $BS_j$ can serve up-to $K_j$ users the total number of free variables, $\{a_{k,j}\}$, equals $$\sum_{j \in J} (|\mathcal{K}_j| + 1).$$

Embodiments of the invention include architectures that result in solving the "large" load-balancing problem by solving (possibly a sequence of) sets of "smaller" parallel optimization problems, each with complexity that does not grow as the size of the coverage area (over which load balancing is to be applied) expands. Consequently they allow the design of scalable load-balancing algorithms with complexity that does not grow with the size of the network. Furthermore the algorithms described in D. Bethanabhotla et al, "User Association and Load Balancing for Cellular Massive MIMO," in Proc. of Inform. Theory and Applications Workshop, ITA 2014, San Diego, Calif.; available at http://ita.ucsd.edu/workshop/14/files/paper/paper_1660. pdf, which solve the centralized problems described in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014, can also be applied (with appropriate modifications) to solve these "smaller" problems. The scalable architectures described in many ways complement the approaches disclosed in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014.

Architectures Enabling Scalable Load Balancing Algorithms

In one embodiment, architectures obtain load-balancing benefits without requiring the solution of a centralized optimization problem with an exploding number of free variables. These architectures rely on overlapping clusters of nearby sets of BSs for load balancing. Let G denote the number of these overlapping clusters of BSs. The set of BSs comprising the g-th cluster, with g belonging in the set $G = \{1, 2, \ldots, G\}$ is denoted as J(g) and is a subset of the set of all BSs denoted by J.

For the purpose of the load-balancing problems of interest, the g-th cluster "serves" a subset of users, referred to as g-th user group K(g). The union of all user groups (over all g in the set G) is the set of all users, and is denoted by K. In the considered architectures, the clusters of BSs are constructed large enough so that, for each user, k, there is a cluster that contains all the BSs that could potentially serve user k.

In one embodiment, the clusters are also alternatively "defined" in terms of a partitioning of the users in user groups. In particular, the set of all users across the topology (over which load balancing is to be applied) is viewed as being partitioned into non-overlapping user-sets, i.e., we partition the set of all users K into G non-overlapping groups, with K(g) denoting the g-th user group. This can be made readily possible by, e.g., tessellating the coverage area into small contiguous tiles (e.g., rectangles, squares) and then associating with each tile of users a "sufficiently large" cluster of BSs.

Such a tessellation of the layout in non-overlapping tiles (e.g., hexagons or squares) provides a simple way of defining these overlapping clusters of BSs. Specifically, the processor starts by enumerating the tiles from 1 to some G, and then define the g-th user-group K(g) as the set of users within the g-th tile. Then the set J(g) of BSs is defined as comprising the cluster in such a way that no BS that could serve users in the g-th the is excluded. This can be accomplished via, e.g., large-scale SINR based criteria: we may include an BS in J(g), if it has a sufficiently high large-scale SINR to at least one user in K(g). For instance, we may set as $J_k$ the set of BSs that could serve user k, i.e., the set of BSs with sufficiently high large-scale SINR to user k.

Figure 9:
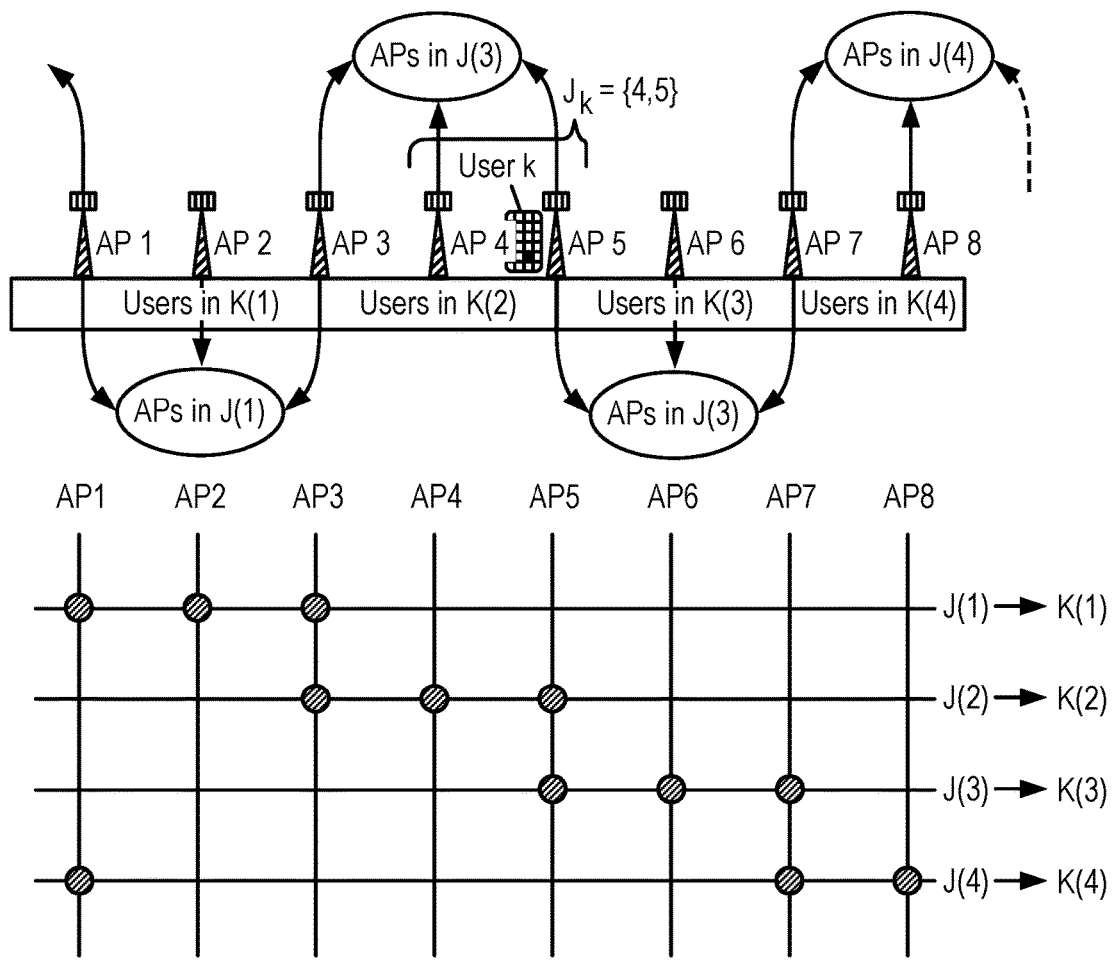
FIG. 9 illustrates an example of overlapped clusters spanning a number of BSs with wrap-around BSs are labeled as access points (APs).

With this architecture, in one embodiment, all users in a tile are uniquely associated with the cluster serving the tile. In one embodiment, load balancing is accomplished in these overlapped cluster architectures by having each BS allocate (balance) its transmission resources across all the clusters to which this BS belongs. Based on the transmission resources available to a given cluster, g, by each of its BSs, J(g), a controller for that cluster (one controller/cluster in this architecture) allocates these resources to its user set, K(g). The situation is illustrated in FIG. 2. Referring to FIG. 9, an example of G=4 overlapped clusters spanning J=8 BSs with wrap-around BSs are labeled as APs.

Assuming that the cluster associated with a user tile includes all the BSs that can serve any user in the tile, the above architecture is not limiting the resource allocation options with respect to centralized optimization. In one embodiment, for any feasible activity fraction allocation for the centralized optimization, i.e., for any set of free variables, $\{a_{k,j}\}$, with k denoting the user index and j the BS index, there exists a resource allocation of each BS to its clusters (for, e.g., the setting in FIG. 2), which can enable each cluster controller to provide to its users the activity fractions $\{a_{k,j}\}$.

Also note that once the load balancing solution (e.g., activity fraction allocations to users) is computed and a feasible scheduling assignment is computed, each BSschedules and serves its users in conventional cellular MU-MIMO transmission. Furthermore, these architectures enable the use of iterative scalable algorithms.

User-centric vs. Network-centric User Association

One important distinction between the centralized load-balancing methods disclosed in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014, and the conventionally used SINR-based schemes for assigning users to BSs is the mechanism that determines user-BS association. Unlike the SINR-based scheme (as well as several other load-balancing schemes proposed in the literature), where such association is user-centric (decided by the user), the centralized load-balancing methods in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014, suggest the use of a network-centric association, i.e., they imply that user-BS association is decided by the network. Indeed, the alternative methods, i.e., conventional user-centric schemes rely on association based on beacons broadcasted by the BS. At the higher frequencies where the massive-array small cells would be possible, the harsh pathloss attenuation severely limits the range of the beacon broadcast. Note that this does not apply to data transmitted by the small cell as these are transmitted on beams that are tailored to the specific user channels and these benefit from very large beamforming gains from the massive arrays. In one embodiment, users broadcast their beacons and have the massive BS arrays estimate the received signal levels. Indeed these user-beacons inherently benefit from the massive array receive-antenna processing gain at each BS. Hence, they inherently enable efficient acquisition of large-scale SINR at all nearby BSs (where a receive MIMO array processing gain can be naturally harvested at each of the BSs).

The architectures described herein inherently enable user-centric, network-centric, and hybrid forms of association. In one embodiment, such example of association includes a user monitors its SINRs from different clusters of BSs and uses that information to signal back its preferred cluster. The determination of which BS or BSs within the user's preferred cluster should serve the user could be then be network-centric centric, leading to a hybrid form of association, whereby a user chooses the cluster but the cluster chooses the BS or BSs that would serve the user.

Note that in one embodiment, load balancing among clusters is performed by use of the resource-allocation from each BS to its clusters, which changes over large time-scales (even in the order of minutes). Also "cluster hand-offs" can be performed at a much slower time scale than conventional hand-offs from BS to BS. Indeed, since the sets of BSs comprising nearby clusters overlap (see FIG. 2), there is additional built-in flexibility in cluster hand-offs, allowing the performance of these hand-offs at longer time scales than conventional hand-offs.

Note also that cluster beacons inherently offer significant advantages with respect to BS beacons for association. Unlike the BS beacons, which are needed also for estimating which BS with which a user should associate, cluster beacons are just needed to confine association within a "cluster" region that could be served by several BSs. As such, these cluster beacons need not be at the frequency band of data transmission, and they need not emanate from a single location. In one embodiment, the beacon may be transmitted from a single location "in the center of the cluster" but at a lower frequency where the beacon has longer range. In another embodiment, the transmission (whether on the same or lower frequency) emanates from multiple BSs in the cluster. In this case, by employing techniques such as cyclic-delay diversity, macro-diversity benefits can be provided to the cluster-beacon, enhancing its range as well as minimizing the variations in its received strength, thereby improving the quality of the beacon estimate provided to the users.

Load-Balancing Problem Formulation Based on Cluster Architectures

The disclosed architectures allow a reformulation of the load-balancing problem that enables the development of scalable algorithms for scheduling/load-balancing across a wireless network. This problem can be broken into two sets of smaller problems, one involving parallel intra-cluster load-balancing problems, and the other involving a transmission resource allocations at each BS to its clusters. In one embodiment, the problems in each set are solved in parallel. However, there is coupling between the two sets, providing a platform for (possibly) iterative algorithm refinement, and/or online adaptation. These two sets of problems are referred to herein as "inner" and "outer" optimization subproblems.

In one embodiment, there is a single inner and a single outer iteration problem. In one embodiment, there are several iterations, and, at each iteration, the load balancing solution is refined or updated. At any given iteration, the inner optimization considers many parallel resource allocation problems, one per cluster of BSs. In each of these problems, a controller allocates transmission resources (made available to it by its BSs) at the local intra-cluster level, to the users associated with the given cluster. The "outer" optimization problem comprises a set of reallocations of the transmission resources by each of the BSs to the clusters it belongs. Below we show sample embodiments of the two problems, which can be solved with standard or special purpose convex optimizers.

Inner Optimization Sub-problem (Intra-cluster Optimization Problem)

Next, the inner-optimization sub-problem is considered. At any iteration, the inner optimization involves G parallel (independent) resource allocation problems, whereby the g-th problem is about allocating resources at each base-station in the g-th cluster of BSs, J(g), to serve the users in the g-th group of users, K(g).

At a given iteration, n, the g-th inner optimization problem involves solving a problem like the problem addressed in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014, (involving a central-controller performing load balancing across an area serviced by multiple BSs) with a few differences. First the g-th inner optimization problem is presumably a "smaller-size" problem, as it is restricted to the set of BSs, J(g), serving the user set K(g) associated with the g-th cluster controller. Second, each BS in the set J(g) is restricted to use only a fraction of its resources on the g-th cluster (as opposed to where all BS transmission resources are available to the central controller). These fractions in these cases can vary over time (and iteration) and are to be provided by the outer iteration sub-problem.

Next the formulation of the g-th inner optimization problem at the n-th iteration for $n \geq 1$ is considered. Let $\beta_{j,g}^{(n-1)}$ denote the fractions of resources allocated by the outer optimization problem, i.e., by BSj to the clusters it belongs, $\mathcal{G}_j$, at the end of the preceding iteration, i.e., iteration n-1. We assume that these resource fractions are "feasible" i.e., they are non-negative and satisfy $\Sigma_g \beta_{j,g}^{(n-1)} \leq 1$ for each BSj.

The inner load-balancing problem in cluster $g = g_o$ involves allocating by $g_o$-th cluster controller the transmission resources $\{\beta_{j,g_o}^{(n-1)}\}$ provided by the BSs in the cluster across the users in the cluster. In particular the load-balancing problem comprises determining the activity fractions $a_{k,j}$ from the BSs in $J(g_o)$ to the users server by cluster $g_o$, i.e., to the users in the set $K(g_o)$:

Problem to be solved by cluster controller $g = g_o$:

$$\text{maximize} \sum_{k \in \mathcal{K}(g_o)} U\left( \sum_{j \in J(g_o)} a_{k,j} R_{k,j} \right) \quad \text{(Inner a)}$$

subject to $$\sum_{j \in J(g_o)} a_{k,j} \leq 1 \quad \forall k \in \mathcal{K}(g_o) \quad \text{(Inner b)}$$

$$\frac{1}{S_j} \sum_{k \in \mathcal{K}(g_o)} a_{k,j} \leq \beta_{j,g_o}^{(n-1)} \quad \forall j \in J(g_o) \quad \text{(Inner c)}$$

$$a_{k,j} \geq 0 \quad \forall k \in \mathcal{K}(g_o), \forall j \in J(g_o) \quad \text{(Inner d)}$$

Denoted by $\{a_{k,j}^{(n)}\}$ is the set of $a_{k,j}$'s returned by the above optimization problem at cluster $g_o$.

Note that the dependence of $a_{k,j}^{(n)}$ on the index $g_o$ has been suppressed. Indeed this dependence is implicit in the user index k, as user k is served by a single g value, i.e., by a single cluster of BSs.

The output of the n-th iteration intra-cluster algorithm in cluster $g = g_o$ is a set of real nonnegative numbers $$\{a_{k,j}^{(n)}; k \in \mathcal{K}(g_o), j \in J(g_o)\} \quad \text{(Inner Output)}$$

Cluster $g_o$ provides this set to all its BSs $j \in J(g_o)$.

Note that in one embodiment these parallel cluster optimization problems are used for load balancing, and not for directly scheduling transmissions. Indeed, after the last iteration, each BS gathers all the activity fractions provided by all the clusters it is a part of. Then each BS (and not its cluster controllers) uses them to generate a scheduling policy for cellular transmission, so that the long-term fraction of transmission resources allocated to each user by the BS approximately matches the target activity fractions shared by its cluster controllers. Furthermore, note that, assuming the "input" transmission-resource allocation from each BS to its clusters is feasible, i.e., assuming that $\Sigma_g \beta_{j,g}^{(n-1)} \leq 1$ for each BS j, and that $\beta_{j,g}^{(n-1)} \geq 0$ for all g and j, the resulting activity fraction allocations in (Inner Output) are feasible with respect to the constraints of (Inner b)-(Inner d) at each BS.

Outer Optimization Sub-problem (BS-to-clusters Transmission-Resource Balancing)

In this section, the outer optimization subproblem is considered. In this case, each $BSj = j_o$ uses the set of $\{a_{k,j_o}^{(n)}\}$ from (Inner Output) that is shared by the cluster controllers of which it is a part, i.e., by the set of clusters $\mathcal{G}_{j_o}$, to determine a new set of transmission resource allocations to each of the elements in $\mathcal{G}_{j_o}$. Hence, the output of the n-th iteration algorithm at BS $j = j_o$ is a set of $\{\beta_{j_o,g}^{(n)}; g \in \mathcal{G}_{j_o}\}$ with $\beta_{j,g}^{(n)}$ denoting the resources allocated by BSj to the g-th cluster after iteration n.

For convenience, let $\mathcal{K}_j^{(n)}(g)$ denote the subset of users from the user group $\mathcal{K}(g)$, which have non-zero fractions only to BS $j \in J(g)$, based on the output by the inner optimization algorithm at iteration n given by (Inner Output). Let $\tilde{\mathcal{K}}_j^{(n)}(g)$ denote the subset of users from the user group $\mathcal{K}(g)$ which have non-zero fractions to BS $j \in J(g)$ and at least one more BS in $J(g)$. Also defined are $$\mathcal{K}^{(n)}(g) = \bigcup_{j \in J_g} \mathcal{K}_j^{(n)}(g) \text{ and } \tilde{\mathcal{K}}^{(n)} = \bigcup_{j \in J_g} \tilde{\mathcal{K}}_j^{(n)}(g)$$

Note that $\mathcal{K}^{(n)}(g)$ denotes the collection of users that are to be served by a single BS in cluster g, based on the activity fractions provided by the n-th iteration cluster sub-problems. Similarly, the set $\tilde{\mathcal{K}}$ denotes the collection of fractional users, i.e., users that are to be served by {multiple} BSs based on the activity fractions provided by the n-th iteration cluster sub-problems. Letting also $$\mathcal{K}_j^{(n)} = \bigcup_{g \in \mathcal{G}_j} \mathcal{K}_j^{(n)}(g) \text{ and } \tilde{\mathcal{K}}_j^{(n)} = \bigcup_{g \in \mathcal{G}_j} \tilde{\mathcal{K}}_j^{(n)}(g)$$

Note that $\mathcal{K}_j^{(n)}$ denotes the users that are to be served by BS j only, based on the activity fractions provided by the n-th iteration cluster sub-problems, while $\tilde{\mathcal{K}}_j^{(n)}$ denotes the set of users that are served by BSj and at least one more BS. In one embodiment, most users are expected to belong in $\mathcal{K}_j^{(n)}(g)$ and only very few users are expected to be fractional, i.e., belong to $\tilde{\mathcal{K}}_j^{(n)}(g)$.

Sample methods for performing the "outer" optimization independently at each of the BSs are disclosed. First, the optimization at BS $j = j_o$ over the set of users that, according to the cluster load-balancing outputs, are to be served only by BS $j_o$ is restricted, i.e., the optimization at BS $j = j_o$ is over the users in the set $\mathcal{K}_{j_o}^{(n)}$. That is, at BS $j = j_o$ we consider reallocation of its resources across its clusters while keeping the transmission resources allocated to the set $\tilde{\mathcal{K}}_{j_o}^{(n)}$ of fractional users fixed. To this end, let $$\hat{\gamma}_{j,g}^{(n)} = \sum_{k \in \mathcal{K}_j^{(n)}(g)} a_{k,j}^{(n)} \text{ and } \varepsilon_{j,g}^{(n)} = \sum_{k \in \tilde{\mathcal{K}}_j^{(n)}(g)} a_{k,j}^{(n)} \quad (\gamma\text{-}\varepsilon \text{ Eqn})$$

The problem at BS $j = j_o$ thus amounts to reallocating the transmission resources available to $\mathcal{K}_{j_o}^{(n)}$, i.e., $$\Gamma_{j_o}^{(n)} = 1 - \sum_{g \in \mathcal{G}_{j_o}} \varepsilon_{j_o,g}^{(n)} \quad (\Gamma \text{ Eqn})$$

across the clusters in $\mathcal{G}_{j_o}$. In one embodiment, a set of variables $\{\gamma_{j_o,g} \geq 0\}$ are subject to the constraint $$\sum_{g \in \mathcal{G}_{j_o}} \gamma_{j_o,g} \leq \Gamma_{j_o}^{(n)}$$

By enforcing a linear variation of the user activity fractions in $\mathcal{K}_{j_o}^{(n)}(g)$ with $\gamma_{j_o,g}$, i.e., $$a_{k,j_o} = \frac{\gamma_{j_o,g}}{\hat{\gamma}_{j_o,g}^{(n)}} a_{k,j_o}^{(n)} \quad \text{(a Eqn)}$$

and letting $$R_{k,j_o}^{(n)} = \frac{a_{k,j_o}}{\hat{\gamma}_{j_o,g}^{(n)}} R_{k,j_o} \quad \text{(R Eqn)}$$

the rate that user k receives with allocation $a_{k,j_o}$, in terms of $\gamma_{j_o,g}$, is re-expressed since $$\gamma_{j_o,g} R_{k,j_o}^{(n)} = a_{k,j_o} R_{k,j_o}$$

Furthermore, defining $$f_{j_o,g}^{(n)} = \min_{k \in \mathcal{K}_{j_o}^{(n)}(g)} \frac{R_{k,j_o}}{R_{k,j_o}^{(n)}} \quad \forall g \in \mathcal{G}_{j_o} \quad \text{(f Eqn)}$$

the set of user activity constraints for a fixed $j=j_o$, for the users in $\mathcal{K}_{j_o}^{(n)}$, i.e., $$a_{k,j_o} \leq 1, \forall k \in \mathcal{K}_{j_o}^{(n)}(g)$$

is equivalent to the following set of constraints $$\gamma_{j_o,g} \leq f_{j_o,g}^{(n)} \forall g \in \mathcal{G}_{j_o}$$

Hence, the n-iteration of the problem at BS $j=j_o$ of reallocating its transmission resources among the clusters it is a part of, $\mathcal{G}_{j_o}$, is given by
A problem at BS/BS $j=j_o$:

$$\text{maximize} \sum_{g \in \mathcal{G}_{j_o}} \sum_{k \in \mathcal{K}_{j_o}^{(n)}(g_o)} U(\gamma_{j_o,g} R_{k,j_o}^{(n)}) \quad \text{(Outer a)}$$

subject to $$\sum_{g \in \mathcal{G}_{j_o}} \gamma_{j_o,g} \leq \Gamma_{j_o}^{(n)} \quad \text{(Outer b)}$$

$$\gamma_{j_o,g} \leq f_{j_o,g}^{(n)} \quad \forall g \in \mathcal{G}_{j_o} \quad \text{(Outer c)}$$

$$\gamma_{j_o,g} \geq 0 \quad \forall g \in \mathcal{G}_{j_o} \quad \text{(Outer d)}$$

and where $\Gamma_{j_o}^{(n)}$, $R_{k,j_o}^{(n)}$, $f_{j_o,g}^{(n)}$ are given by ($\Gamma$ Eqn), (R Eqn), and (f Eqn), respectively.

Letting $\gamma_{j_o,g}^{(n)}$ denote the value of $\gamma_{j_o,g}$ returned by the solution to the problem described by (Outer a)-(Outer d), the new transmission-resource allocations from BS $j=j_o$ are given by:

$$\beta_{j_o,g}^{(n)} = \gamma_{j_o,g}^{(n)} + \epsilon_{j_o,g}^{(n)} \quad \text{(Outer Output)}$$

with $\epsilon_{j_o,g}^{(n)}$ given by ($\gamma-\epsilon$ Eqn) for $j=j_o$.

The above steps can be identified as an embodiment of the operation disclosed in FIG. 7. In one embodiment, step 292 at BS unit 200-$j_o$ corresponds to computing the $\hat{\gamma}_{j_o,g}^{(n)}$'s and the $\epsilon_{j_o,g}^{(n)}$'s in ($\gamma-\epsilon$ Eqn). Step 294 corresponds to obtaining the $\gamma_{j_o,g}^{(n)}$'s by solving the (Outer) problem. Step 296 corresponds to obtaining the new transmission resource allocations from the BS $j_o$ to its clusters given via $\beta_{j_o,g}^{(n)}$ in (Outer Output).

Note that in one embodiment, the new allocation of the transmission resources by BS $j=j_o$ to its clusters also implies new activity fraction allocations to the users served by BS $j=j_o$. Indeed for the users in the set $\tilde{\mathcal{K}}_{j_o}^{(n)}(g)$ the activity fractions are the same as the input activity fractions from (Inner Output) for $j=j_o$, while for the users in $\mathcal{K}_{j_o}^{(n)}(g)$, the new activity fractions are given by (a Eqn) with $\gamma_{j_o,g}$ replaced by the solution of the problem (Outer a)-(Outer d), i.e., $\gamma_{j_o,g}^{(n)}$. Note that, assuming the original activity fractions from (Inner Output) collectively satisfy the set of constraints (Centralized b)-(Centralized d), the new activity fraction allocations do as well. In one embodiment of the invention, the shared UE-BS activity fraction provided to a BS by all its clusters, are used locally at a given BS to determine new UE-BS activity fractions. This is shown as step 298 in FIG. 7. These improved activity fractions can then be used for determining scheduling assignments in the BS by means of the methods disclosed in D. Bethanabhotla et al, "Method and Apparatus for Scheduling, Load Balancing, and Pilot-Assignments in Reciprocity-Based MIMO Cellular Deployments," PCT Patent Application No. PCT/US2014/068323, filed Dec. 3, 2014.

Example: An interesting case we could consider involves a two-tier scenario, where a single macro and many small cells are using the same transmission resources and hence interfere with one another. FIG. 3 considers a toy example of such a scenario. FIG. 3 depicts a load balancing architecture based on G=5 clusters in a wireless network involving 10 small BSs and 1 macro BS (all operating over the same transmission resources). In FIG. 3, an edge between a cluster controller $g_o$ and a BS $j_o$ signifies that BS $j_o$ is part of cluster $g_o$, that is, $j_o \in \mathcal{J}(g_o)$ and $g_o \in \mathcal{G}_{j_o}$. Note that in the overlapped-cluster architecture depicted in FIG. 3, the macro is a common element of all the clusters. This overlapped architecture enables algorithms that solve the problems described above (the colors in the figure match the frame-colors in the optimization problems). In particular, at each inner iteration, G=5 independent problems of the form (Inner a)-(Inner d), one per cluster, are solved to generate user activity fractions. Then each cluster controller conveys the activity fractions of its users through its edges to each of its BSs. At each outer iteration, J=10+1 transmission resource allocation problems of the form (Outer a)-(Outer d) are solved in parallel, one per BS.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for allocating base station resources for scheduling transmissions by one or more controllers in a wireless network having one or more base stations and a plurality of client terminals, the method comprising:

receiving, by at least one of the one or more controllers, from at least one of the one or more base stations, information indicative of a rate that can be provided by the at least one base station to at least one client terminal by the at least one base station when serving a group of one or more client terminals, the at least one client terminal being associated to the at least one controller;

receiving, by the at least one of the one or more controllers, from the at least one of the one or more base stations, information indicative of the transmission resources provided by the at least one base station for resource allocation among the at least one client terminal by the at least one controller; and determining, by the at least one controller, based on the information indicative of the rate and the information indication of transmission resources, information indicative of an allocation of base station transmission resources for at least one client terminal from the at least one base station.

2. The method defined in claim 1 further comprising performing user scheduling at each of the at least one base station based on the information indicative of the allocation provided by at least one cluster controller to the at least one base station indicative of the allocation of resources of base station-client pairs and based one or more of user and application constraints.

3. The method defined in claim 2 wherein scheduling of client terminals is performed independently at each base station in the one or more base stations based on the resource allocation determined by the at least one cluster controller.

4. The method defined in claim 1 wherein the information indicative of the allocation comprises one or more activity fractions specifying fractions of resources a client is served by a base station in the client terminal group size for at least one base station-client pair when scheduling client terminals in the group and for at least one power mask.

5. The method defined in claim 1 further comprising applying, by the at least one cluster controller, a utility metric.

6. The method defined in claim 5 further comprising combining, into a single metric, average rates provided by individual controllers in the at least one controller based on resources allocated to the client terminals that are associated with the at least one controller.

7. The method defined in claim 5 wherein the utility metric is based on an α-fairness criterion.

8. The method defined in claim 1 wherein the information indication of the user rate is dependent on the large-scale propagation characteristics of wireless channels between client terminals and base stations in the wireless network.

9. The method defined in claim 1 further comprising modifying information indicative of the transmission resources provided by the at least one base station to the at least one cluster controller based on information provided by the at least one cluster controller to the at least one base station that is indicative of the allocation of resources of base station-client pairs.

10. A cluster controller for allocating base station resources for scheduling transmissions in a wireless network having one or more base stations and a plurality of client terminals, the cluster controller comprising:

a collector to receive, from at least one of the one or more base stations, information indicative of a rate that can be provided by the at least one base station to at least one client terminal by the at least one base station when serving a group of one or more client terminals and information indicative of the transmission resources provided by the at least one base station for resource allocation among the at least one client terminal by the at least one controller, the at least one client terminal being associated to the at least one controller; and a load balancer to determine, based on the information indicative of the rate and the information indication of transmission resources, information indicative of an allocation of base station transmission resources for at least one client terminal from the at least one base station.

11. The cluster controller defined in claim 10 wherein the information indicative of the allocation comprises one or more activity fractions specifying fractions of resources a client is served by a base station in the client terminal group size for at least one base station-client pair when scheduling client terminals in the group and for at least one power mask.

12. The cluster controller defined in claim 10 wherein the load balancer is operable to apply a utility metric.

13. The cluster controller defined in claim 12 wherein the load balancer combines, into a single metric, average rates provided by individual controllers based on resources allocated to the client terminals that are associated with the at least one controller.

14. The cluster controller defined in claim 12 wherein the utility metric is based on an a-fairness criterion.

15. The cluster controller defined in claim 10 wherein the information indication of the user rate is dependent on the large-scale propagation characteristics of wireless channels between client terminals and base stations in the wireless network.

16. A wireless communication network comprising:
one or more base stations;
a plurality of client terminals; and
one or more controllers to allocate base station resources for scheduling transmissions, at least one client terminal being associated to a controller of the one or more controllers, the one or more controllers, wherein each of the one or more controllers comprises
a collector to receive, from at least one of the one or more base stations, information indicative of a rate that can be provided by the at least one base station to at least one client terminal by the at least one base station when serving a group of one or more client terminals and information indicative of the transmission resources provided by the at least one base station for resource allocation among the at least one client terminal by the at least one controller, the at least one client terminal being associated to the at least one controller, and
a load balancer to determine, based on the information indicative of the rate and the information indication of transmission resources, information indicative of an allocation of base station transmission resources for at least one client terminal from the at least one base station.

17. The network defined in claim 16 wherein each of the at least one base station is operable to perform user scheduling based on the information indicative of the allocation provided by at least one cluster controller to the at least one base station indicative of the allocation of resources of base station-client pairs and based one or more of user and application constraints.

18. The network defined in claim 17 wherein the one or more base stations is operable to perform scheduling of client terminals independently based on the resource allocation determined by the at least one cluster controller.

19. The network defined in claim 16 wherein the information indicative of the allocation comprises one or more activity fractions specifying fractions of resources a client is served by a base station in the client terminal group size for at least one base station-client pair when scheduling client terminals in the group and for at least one power mask.

20. The network defined in claim 16 wherein the load balancer is operable to apply a utility metric.

21. The network defined in claim 20 wherein the load balancer combines, into a single metric, average rates provided by individual controllers based on resources allocated to the client terminals that are associated with the at least one controller.

22. The network defined in claim 20 wherein the utility metric is based on an a-fairness criterion.

23. The network defined in claim 16 wherein the information indication of the user rate is dependent on the large-scale propagation characteristics of wireless channels between client terminals and base stations in the wireless network.

* * * * *